United States Patent
Zhao et al.

(10) Patent No.: US 8,351,418 B2
(45) Date of Patent: Jan. 8, 2013

(54) SYSTEM AND METHOD FOR POINT TO MULTIPOINT INTER-DOMAIN MULTIPROTOCOL LABEL SWITCHING TRAFFIC ENGINEERING PATH CALCULATION

(75) Inventors: Qianglin Quintin Zhao, Boxborough, MA (US); Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 256 days.

(21) Appl. No.: 12/708,048

(22) Filed: Feb. 18, 2010

(65) Prior Publication Data

US 2010/0208733 A1    Aug. 19, 2010

Related U.S. Application Data

(60) Provisional application No. 61/153,769, filed on Feb. 19, 2009.

(51) Int. Cl.
*H04L 12/28* (2006.01)
(52) U.S. Cl. .................................. 370/351; 370/401
(58) Field of Classification Search .............. 370/254, 370/255, 351, 390, 40, 401
See application file for complete search history.

(56) References Cited

U.S. PATENT DOCUMENTS

| | | | | |
|---|---|---|---|---|
| 7,406,481 B2 * | 7/2008 | Saha et al. | ............................. | 1/1 |
| 7,701,940 B2 * | 4/2010 | Novello et al. | ............... | 370/390 |
| 7,801,137 B2 * | 9/2010 | Vasseur et al. | ................ | 370/390 |
| 7,821,951 B2 * | 10/2010 | Douville | ........................ | 370/248 |
| 2004/0184441 A1 * | 9/2004 | Wu et al. | ........................ | 370/351 |
| 2009/0245253 A1 | 10/2009 | Chen et al. | | |

FOREIGN PATENT DOCUMENTS

| | | |
|---|---|---|
| JP | 2007-074308 | 3/2007 |
| JP | 2007-228087 | 9/2007 |
| JP | 2008-206095 | 9/2008 |
| JP | 2008-211656 | 9/2008 |

OTHER PUBLICATIONS

Zhao, et al., "Extensions to the Path Computation Element Communication Protocol (PCEP) for Point-to-Multipoint Traffic Engineering Label Switched Paths," draft-ietf-pce-pcep-p2mp-extensions-00.txt; Sep. 9, 2008.

Vasseur, J.P., et al., "A backward Recursive PCE-Based Computation (BRPC) Procedure to Compute Shortest Inter-Domain Traffic Engineering Label Switched Paths," draft-ietf-pce-brpc-07.txt, Feb. 8, 2008.

Chen, Mach, "Inter-AS PCE Path Sequence Autoexplore," draft-chen-pce-interas-pce-sequence-autoexplore-00.txt, Oct. 12, 2006.

(Continued)

*Primary Examiner* — Hong Cho
(74) *Attorney, Agent, or Firm* — Conley Rose, P.C.; Grant Rodolph; Clint Wilkins

(57) ABSTRACT

A system comprising a plurality of path computation elements (PCEs) configured to communicate with an ingress node, jointly compute a core tree for an inter-domain point-to-multipoint (P2MP) tree across a plurality of network domains, and independently compute a plurality of sub-trees in at least some of the network domains, wherein the core tree connects the ingress node to a boundary node (BN) in each one of the network domains that have a destination node and each sub-tree connects the BN to a plurality of destination nodes in one of the network domains that have a destination node.

24 Claims, 16 Drawing Sheets

OTHER PUBLICATIONS

Vasseur, J.P., Ed. et al., "Path Computation Element (PCE) Communication Protocol (PCEP)," draft-ietf-pce-pcep-10.txt, Feb. 11, 2008.

Zhao, Q., et al., "PCE-Based Computation Procedure to Compute Shortest Constrained P2MP Inter-domain Traffic Engineering Label Switched Paths," draft-zhao-pce-pcep-inter-domain-p2mp-procedures-00.txt, Mar. 4, 2009.

Foreign Communication from a Counter-part application, PCT/US2010/024577, International Search Report, May 6, 2007, 6 pages.

Foreign Communication from a Counter-part application, PCT/US2010/024577, Written Opinion, May 6, 2007, 10 pages.

Farrel, et al. "A Framework for Inter-Domain Multiprotocol Label Switching Traffic Engineering", RFC 4726, Nov. 2006.

Farrel, et a. "A Path Computation Element (PCE)-Based Architecture ", RFC 4655, Aug. 2006.

JP. Vasseur. et al., "A Backward Recursive PCE-based Computation (BRPC) Procedure to Compute Shortest Inter-domain Traffic Engineering Label Switched Paths," draft-ietf-pce-brpc-09.txt; Apr. 14, 2008.

R. Aggarwal, etc. "Extensions to Resource Reservation Protocol—Traffic Engineering (RSVP-TE) for Point-to-Multipoint TE Label Switched Paths (LSPs)", RFC 4875, May 2007.

King, et al., "The Application of the Path Computation Element Architecture to the Determination of a Sequence of Domains in MPLS & GMPLS," draft-king-pce-hierarchy-fwk-03.txt, Dec. 30, 2009.

Zhao, et al., "PCE-Based Computation Procedure to Compute Shortest Constrained P2MP Inter-domain Traffic Engineering La bel Switched Paths," draft-zhao-pce-pcep-inter-domain-p2mp-procedures-02.txt, Oct. 24, 2009.

Zhao, et al., "PCE-Based Computation Procedure to Compute Shortest Constrained P2MP Inter-domain Traffic Engineering La bel Switched Paths," draft-zhao-pce-pcep-inter-domain-p2mp-procedures-03.txt, Feb. 4, 2010.

Zhao, et al., "Extensions to the Path Computation Element Communication Protocol (PCEP) for Point-to-Multipoint Traffic Engineering Label Switched Paths," draft-ietf-pce-pcep-p2mp-extensions-01.txt, Oct. 30, 2008.

Zhao, et al., "Extensions to the Path Computation Element Communication Protocol (PCEP) for Point-to-Multipoint Traffic Engineering Label Switched Paths," draft-ietf-pce-pcep-p2mp-extensions-07.txt, Feb. 2, 2010.

Zhao, et al., "Extensions to the Path Computation Element Communication Protocol (PCEP) for Point-to-Multipoint Traffic Engineering Label Switched Paths," draft-ietf-pce-pcep-p2mp-extensions-05.txt, Oct. 25, 2009.

Zhao, et al., "Extensions to the Path Computation Element Communication Protocol (PCEP) for Point-to-Multipoint Traffic Engineering Label Switched Paths," draft-ietf-pce-pcep-p2mp-extensions-04.txt, Aug. 18, 2009.

Zhao, et al., "Extensions to the Path Computation Element Communication Protocol (PCEP) for Point-to-Multipoint Traffic Engineering Label Switched Paths," draf-ietf-pce-pcep-p2mp-extensions-06.txt, Dec. 30, 2009.

Yasukawa, et al., "Applicability of the Path Computation Element (PCE) to Point-to-Multipoint (P2MP) Mulitprotocol Label Switching (MPLS) and Generalized MPLS (GMPLS) Traffic Engineering (TE)," draft-ietf-pce-p2mp-app-01.txt, Feb. 13, 2009.

Yasukawa, et al., "Applicability of the Path Computation Element (PCE) to Point-to-Multipoint (P2MP) Mulitprotocol Label Switching (MPLS) and Generalized MPLS (GMPLS) Traffic Engineering (TE)," draft-ietf-pce-p2mp-app-02.txt, Aug. 17, 2009.

Yasukawa, et al., "Applicability of the Path Computation Element (PCE) to Point-to-Multipoint (P2MP) MPLS and GMPLS Traffic Engineering (TE)," RFC 5671, Oct. 2009.

Yasukawa, et al., "PCC-PCE Communication Requirements for Point to Multipoint Multiprotocol Label Switching Traffic Engineering (MPLS-TE)," draft-yasukawa-pce-p2mp-req-05, May 2008.

Yasukawa, et al., "PCC-PCE Communication Requirements for Point to Multipoint Multiprotocol Label Switching Traffic Engineering (MPLS-TE)," draft-ietf-pce-p2mp-req-05.txt, Jan. 29, 2010.

Yasukawa, et al., "PCC-PCE Communication Requirements for Point to Multipoint Multiprotocol Label Switching Traffic Engineering (MPLS-TE)," draft-ietf-pce-p2mp-req-01.txt, Feb. 13, 2009.

Bradner, S., "Key Words for Use in RFCs to Indicate Requirement Levels," BCP 14, RFC 2119, Mar. 1997.

Vasseur, JP., et al., "A Per-Domain Path Computation Method for Establishing Inter-Domain Traffic Engineering (TE) Label Switched Paths (LSPs)," RFC 5152, Feb. 2008.

Bradford, R., Ed., et al., "Preserving Topology Confidentiality in Inter-Domain Path Computation Using a Path-Key-Based Mechanism," RFC 5520, Apr. 2009.

Bradford,R., Ed., et al., "Preserving Topology Confidentiality in Inter-Domain Path Computation Using a Key-Based Mechanism," draft-ietf-pce-path-key-05.txt, Nov. 17, 2008.

Vasseur, JP., et al., "Path Computation Element (PCE) Communication Protocol (PCEP)," RFC 5440, Mar. 2009.

Vasseur, JP., Ed., et al., "Path Computation Element (PCE) Communication Protocol (PCEP)," draft-ietf-pce-pcep-19.txt, Nov. 17, 2008.

Vasseur, JP., et al., "A Backward-Recursive PCE-Based Computation (BRPC) Procedure to Compute Shortest Constrained Inter-Domain Traffic Engineering Label Switched Paths," RFC 5441, Apr. 2009.

Le Roux, JL., et al., "Encoding of Objective Functions in the Path Computation Element Communication Protocol (PCEP)," RFC 5541, Jun. 2009.

Le Roux, JL., et al., "Encoding of Objective Functions in the Path Computation Element Communication Protocol (PCEP)," draft-ietf-pce-of-06.txt, Dec. 27, 2008.

Yasukawa, S., "Signaling Requirements for Point-to-Multipoint Traffic-Engineered MPLS Label Switched Paths (LSPs)," RFC 4461, Apr. 2006.

Bitar, N., et al., "Inter-AS Requirements for the Path Computation Element Communication Protocol (PCECP)," RFC 5376, Nov. 2008.

Zhao, et al., "PCE-Based Computation Procedure to Compute Shortest Constrained P2MP Inter-Domain Traffic Engineering Label Switched Paths," draft-zhao-pce-pcep-inter-domain-p2mp-procedures-04.txt, Mar. 8, 2010.

Zhao, et al., "PCE-Based Computation Procedure to Compute Shortest Constrained P2MP Inter-Domain Traffic Engineering Label Switched Paths," draft-zhao-pce-pcep-inter-domain-p2mp-procedures-01.txt, Jul. 12, 2009.

Zhao, et al., "PCE-Based Computation Procedure to Compute Shortest Constrained P2MP Inter-Domain Traffic Engineering Label Switched Paths," draft-zhao-pce-pcep-inter-domain-p2mp-procedures-00.txt, Mar. 4, 2009.

Farrel, A., "Reduced Backus-Naur Form (RBNF) A Syantax Used in Various Protocol Specifications," draft-farrel-rtg-common-bnf-08.txt, Feb. 5, 2009, 15 pages.

Kiran Koushik, A.S., et al., "PCE Communication Protocol (PCEP) Management Information Base," draft-ietf-pce-pcep-mib-00.txt, Jan. 22, 2009, 22 pages.

Nishioka, I., et al., "The Use of SVEC (Synchronization VECtor) List for Synchronized Dependent Path Computations," draft-nishioka-pce-svec-list-02.txt, Jul. 4, 2008, 15 pages.

Nishioka, I., et al., "The Use of SVEC (Sychronization VECtor) List for Synchronized Dependent Path Computations," draft-ietf-pce-pcep-svec-list-00.txt, Sep. 29, 2008, 15 pages.

Nishioka, I., et al., "The Use of SVEC (Sychronization VECtor) List for Synchronized Dependent Path Computations," draft-ietf-pce-pcep-svec-list-04.txt, Feb. 10, 2010, 18 pages.

Touch, J., et al., "The TCP Authentication Option," draft-ietf-tcpm-tcp-auth-opt-03.txt, Feb. 16, 2009, 41 pages.

Touch, J., et al., "The TCP Authentication Option," draft-ietf-tcpm-tcp-auth-opt-10.txt, Jan. 31, 2010, 48 pages.

Awduche, D., et al., "RSVP-TE: Extensions to RSVP for LSP Tunnels," RFC 3209, Dec. 2001, 57 pages.

Berger, L., et al., "Generalized Multi-Protocol Label Switching (GMPLS) Signaling Resource Reservation Protocol-Traffic Engineering (RSVP-TE) Extensions," RFC 3473, Jan. 2003, 43 pages.

Berger, L., et al., "GMPLS Segment Recovery," RFC 4873, May 2007, 26 pages.

Lindem, A., Ed., et al., "Extensions to OSPF for Advertising Optional Router Capabilities," RFC 4970, Jul. 2007, 13 pages.

Vasseur, J.P. Ed., et al., "IGP Routing Protocol Extensions for Discovery of Traffic Engineering Node Capabilities," RFC 5073, Dec. 2007, 13 pages.

Le Roux, J.L., Ed., et al., "OSPF Protocol Extensions for Path Computation Element (PCE) Discovery," RFC 5088, Jan. 2008, 19 pages.

Le Roux, J.L, Ed., et al., "IS-IS Protocol Extensions for Path Computation Element (PCE) Discovery," RFC 5089 Jan. 2008, 16 pages.

Bryskin, I., et al., "Policy-Enabled Path Computation Frameowrk," RFC 5394, Dec. 2008, 37 pages.

Farrel, A., "Routing Backus-Naur Form (RBNF) : A Syntax Used to Form Encoding Rules in Various Routing Protocol Specifications," RFC 5511, Apr. 2009, 15 pages.

Foreign Communication From A Related Counterpart Application, Japanese Application 2011-514902, Japanese Office Action dated Sep. 4, 2012, 8 pages.

Foreign Communication From A Related Counterpart Application, Japanese Application 2011-514902, Partial English Translation of Japanese Office Action dated Sep. 4, 2012, 6 pages.

* cited by examiner

SYSTEM AND METHOD FOR POINT TO MULTIPOINT INTER-DOMAIN MULTIPROTOCOL LABEL SWITCHING TRAFFIC ENGINEERING PATH CALCULATION

CROSS-REFERENCE TO RELATED APPLICATIONS

The present application claims priority to U.S. Provisional Patent Application No. 61/153,769 filed Feb. 19, 2009 by Qianglin Quintin Zhao et al. and entitled "System and Method for Point to Multipoint Inter-Domain MPLS Traffic Engineering Path Calculation," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In some networks, such as Multiprotocol Label Switching (MPLS) networks and Generalized MPLS (GMPLS) networks, a Traffic Engineering (TE) Label Switched Path (LSP) can be established by MPLS (or GMPLS) with a path provided by a Path Computation Client (PCC) and a Path Computation Element (PCE). Specifically, the PCC requests a path or route from the PCE, and the PCE computes the path and forwards the computed path information back to the PCC. The path can comprise a plurality of nodes and/or Label Switch Routers (LSRs) and extend from a source node or LSR to a destination node or LSR. In some cases, the path may be a point-to-point (P2P) path, which is computed across single or multiple areas or Autonomous System (AS) domains. In other cases, the path may be a Point-to-Multipoint (P2MP) path from a source node to a plurality of destination nodes, which may be referred to as a tree. However, the mechanisms for requesting and computing the P2MP tree across multiple areas or AS domains using the PCC and PCE are still being developed.

SUMMARY

In one embodiment, the disclosure includes a system comprising a plurality of PCEs configured to communicate with an ingress node, jointly compute a core tree for an inter-domain P2MP tree across a plurality of network domains, and independently compute a plurality of sub-trees in at least some of the network domains that have a destination node, wherein the core tree connects the ingress node to a boundary node (BN) in each one of the network domains that have a destination node and each sub-tree connects the BN to a plurality of destination nodes in one of the network domains that have a destination node.

In another embodiment, the disclosure includes a network component comprising at least one processor configured to implement a method comprising obtaining a computation request for an inter-domain P2MP tree from a source node to a plurality of leaf nodes across a plurality of network domains, and computing a core tree that comprises a plurality of paths from the source node to a BN in each of the network domains that comprises at least some of the leaf nodes, calculating a sub-tree for each of the network domains that comprises at least some of the leaf nodes from a BN in the core tree to the leaf nodes, and sending a result of the inter-domain P2MP tree computation to the source node.

In yet another embodiment, the disclosure includes a method comprising computing a core tree from a source node to a BN in each of a plurality of domains that comprise a leaf node, computing a sub-tree from the BN in each of the domains to the leaf node in the same domains, and combining the core tree and the sub-tree in each of the domains to establish inter-domain P2MP tree.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for calculating an inter-domain P2MP path or tree across a plurality of domains. The inter-domain P2MP tree may be computed using a PCC and plurality of PCEs, each of which may be associated with one of the domains. The inter-domain P2MP tree may be established by computing a core tree across the domains and a plurality of sub-trees in each destination domain, which may comprise destination nodes. The core tree may comprise at least one BN in each domain and may be computed based on a Backward Recursive Path Calculation (BRPC) procedure, e.g. using at least some of the PCEs associated with the domains. The sub-tree may be computed in each destination domain using a PCE associated with the domain. The sub-tree may comprise the destination nodes in each destination domain, may be coupled to a BN of the core tree, and may be computed based on a Constrained Shortest Path First (CSPF) procedure. As such, by separately computing the core tree and the sub-trees of the inter-domain P2MP may provide improved LSP computation and may be practical for implementation, e.g. in terms of scalability.

Figure 1:
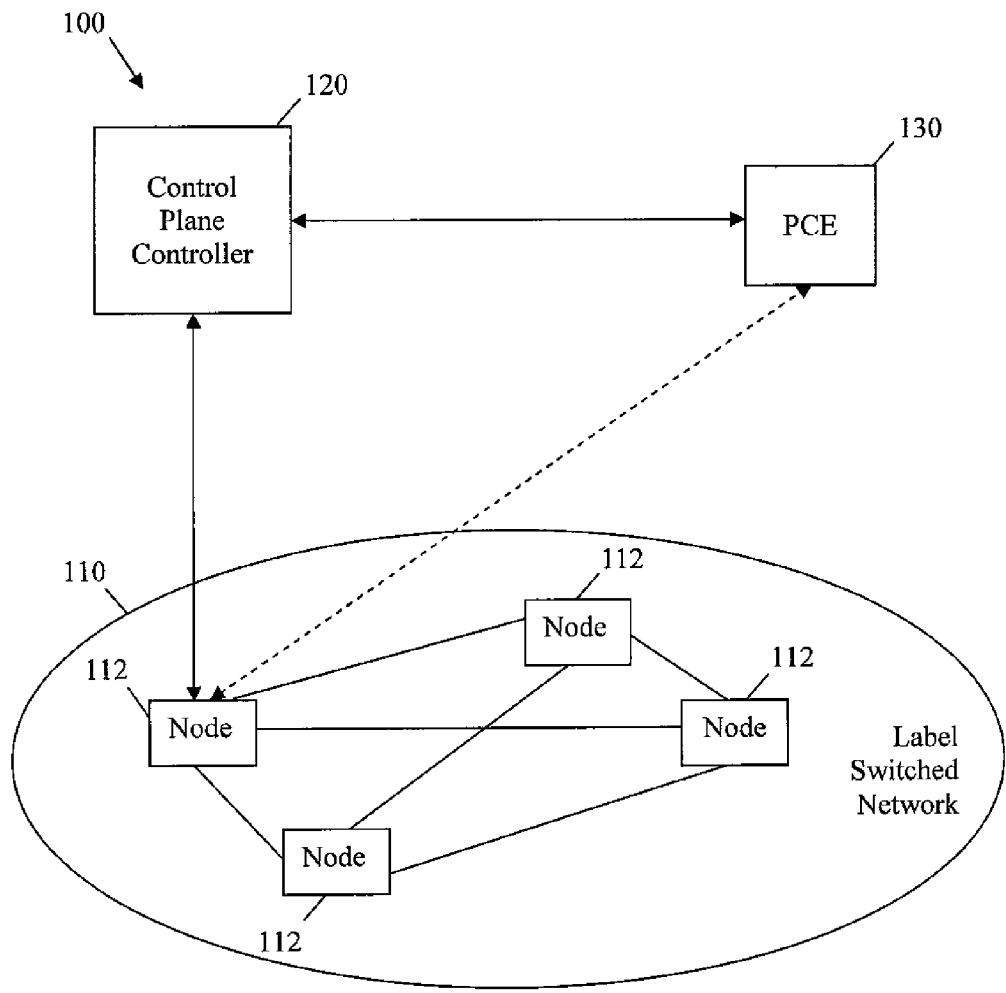
FIG. 1 is a schematic diagram of an embodiment of a label switched system.

FIG. 1 illustrates one embodiment of a label switched system 100, where P2P TE LSPs and P2MP TE LSPs may be established between at least some of the components. The label switched system 100 may comprise a label switched network 110, a control plane controller 120, and at least one PCE 130. The label switched network 110, control plane controller 120, and PCE 130 may communicate with each other via optical, electrical, or wireless means.

In an embodiment, the label switched network 110 may be a packet switched network, where data traffic may be transported using packets or frames along network paths or routes. The packets may be routed or switched along a TE LSP established by a signaling protocol, such as MPLS or GMPLS, based on a path computed by the PCE and/or developed by the nodes 112. The label switched network 110 may comprise a plurality of nodes 112 coupled to one another using optical, electrical, or wireless links. The label switch network 110 may also comprise a plurality of domains, such as AS domains or interior gateway protocol (IGP) areas, which may each comprise a set of network elements corresponding to the same address management and/or path computational responsibility. The domains may be organized via physical means (e.g. location, connections, etc.) or logical means (e.g. network topology, protocols, communication layers, etc.). The different domains may be coupled to each other and may each comprise some of the nodes 112.

In an embodiment, the nodes 112 may be any devices or components that support transportation of the packets through the label switched network 110. For example, the nodes 112 may include bridges, switches, routers, or various combinations of such devices. The nodes 112 may comprise a plurality of ingress ports for receiving packets from other nodes 112, logic circuitry that determines which nodes 112 to send the frames to, and a plurality of egress ports for transmitting frames to the other nodes 112. In some embodiments, at least some of the nodes 112 may be LSRs, which may be configured to modify or update the labels of the packets transported in the label switched network 110. Further, some of the nodes 112 may be label edge routers (LERs). For example, the nodes 112 at the edges of the label switched network 110 may be configured to insert or remove the labels of the packets transported between the switched network 110 and external networks. The first node 112 and the last node 112 along a path are sometimes referred to as the source node and the destination node, respectively. Although four nodes 112 are shown in the label switched network 110, the label switched network 110 may comprise any quantity of nodes 112. Additionally, the nodes 112 may be located in different domains in the label switched network 110 and may be configured to communicate across multiple domains. For example, the nodes 112 that correspond to different domains may exchange packets along a path that may be established across multiple domains.

In an embodiment, the control plane controller 120 may be any device configured to coordinate activities within the label switched network 110, such as a Network Management System (NMS) or Operations Support System (OSS). Specifically, the control plane controller 120 may receive routing requests from the label switched network 110 and provide back the corresponding path information. In addition, the control plane controller 120 may communicate with the PCE 130, for instance using a PCE Protocol (PCEP), provide the PCE 130 with information that may be used for path computation, receive the computed path from the PCE 130, and forward the computed path to at least one of the nodes 112. The control plane controller 120 may be located in a component outside of the label switched network 110, such as an external server, or may be located in a component within the label switched network 110, such as a node 112.

In an embodiment, the PCE 130 may be any device configured to perform all or part of the path computation for the label switched network 110, e.g. based on a path computation request. Specifically, the PCE 130 may receive the information that may be used for computing the path from the control plane controller 120, from the node 112, or both. The PCE 130 may then process the information to obtain the path. For instance, the PCE 130 may compute the path, and determine the nodes 112 including the LSRs along the path. The PCE 130 may then send all or part of the computed path information to the control plane controller 120 or directly to at least one node 112. Further, the PCE 130 may be coupled to or comprise a traffic-engineering database (TED), a P2MP Path database (PDB), a P2P path database, an optical performance monitor (OPM), a physical layer constraint (PLC) information database, or combinations thereof, which may be used to compute the path. The PCE 130 may be located in a component outside of the label switched network 110, such as an external server, or may be located in a component within the label switched network 110, such as a node 112. In an embodiment, a plurality of PCEs 130, which may be associated to a plurality of domains in the label switched network 110, may perform a distributed path computation across the domains based on a path computation request for an inter-domain P2MP tree, as described in detail below.

In an embodiment, the path computation request may be sent to the PCE 130 by a PCC. The PCC may be any client application requesting a path computation to be performed by the PCE 130. The PCC may also be any network component that makes such a request, such as the control plane controller 120, or any node 112, such as a LSR. For instance, the PCC may request from the PCE a P2MP path or P2P path in a single domain or across multiple domains in the label switched network 110. Additionally, the PCC may send the PCE 130 at least some of the path required information.

In an embodiment, the packets transported between network nodes, such as the nodes 112, are referred to as label switched packets, and may comprise labels that may be used to switch the packets along the nodes of a computed path. A path computed or given and signaled by MPLS for transporting or routing the label switched packets may be referred to as a LSP. For example, the LSP may be a TE LSP established using a Resource Reservation Protocol-Traffic Engineering (RSVP-TE). The LSP may be a P2P TE LSP that extends from a source node to a destination node and may be unidirectional, where the packets may be transported in one direction along the path, e.g., from the source node to the destination node in the label switched network 110. Alternatively, the LSP may be a P2MP TE LSP, which may extend from a source or root node to a plurality of destination or leaf nodes. The P2MP TE LSP may be considered as a combination of a plurality of P2P TE LSPs that share the same source node. In some embodiments, the P2MP TE LSP is referred to as a P2MP tree and its P2P TE LSPs are referred to as Source-to-Leaf (S2L) sub-LSPs. The P2MP tree may be used to provide multicast services, such as multicast Virtual Private Networks (VPNs), Internet Protocol Television (IPTV), content-rich media distribution, other high-capacity applications, or combinations thereof. Further, the P2MP tree may be an inter-domain P2MP tree, where the source node and the leaf nodes may be distributed across multiple domains, e.g. in the label switched network 110.

Typically, an inter-domain P2MP tree may be computed using a distributed PCE architecture across multiple domains. For example, a plurality of PCEs may compute a plurality of branching paths in different domains from a source node in one of the domains. The branching paths may extend to the different domains that comprise the leaf nodes. As such, the P2MP path computation may result in a plurality of path options per domain, which may be difficult to coordinate efficiently between the domains. For instance, determining which of the border nodes in the different domains to use for connecting the paths across the domains may be difficult.

One approach to compute the inter-domain P2MP tree is to compute a plurality of shortest inter-domain P2P paths from the source node to each destination or leaf node, and then combine the paths to obtain the inter-domain P2MP tree, e.g. a Steiner P2MP tree. However, the Steiner P2MP tree computation may require the replication of incoming packets to each of the P2P paths at the ingress or source node to accommodate multipoint communications. Such requirement may increase the processing burden on the ingress node and may not be practical in terms of scalability. Additionally, the Steiner P2MP tree computation may not make use of bandwidth sharing when a plurality of P2P paths share at least one link along the paths, which may waste bandwidth resources, memory, MPLS label space, or combinations thereof. Further, the tree may require changing or substantial reconfiguration to add and/or remove a single destination or leaf node from the tree. Therefore, the frequency of the Steiner P2MP tree computation, e.g. in response to link and/or node updates, may be computationally intensive and the resulting reconfiguration may cause system destabilization.

Figure 2:
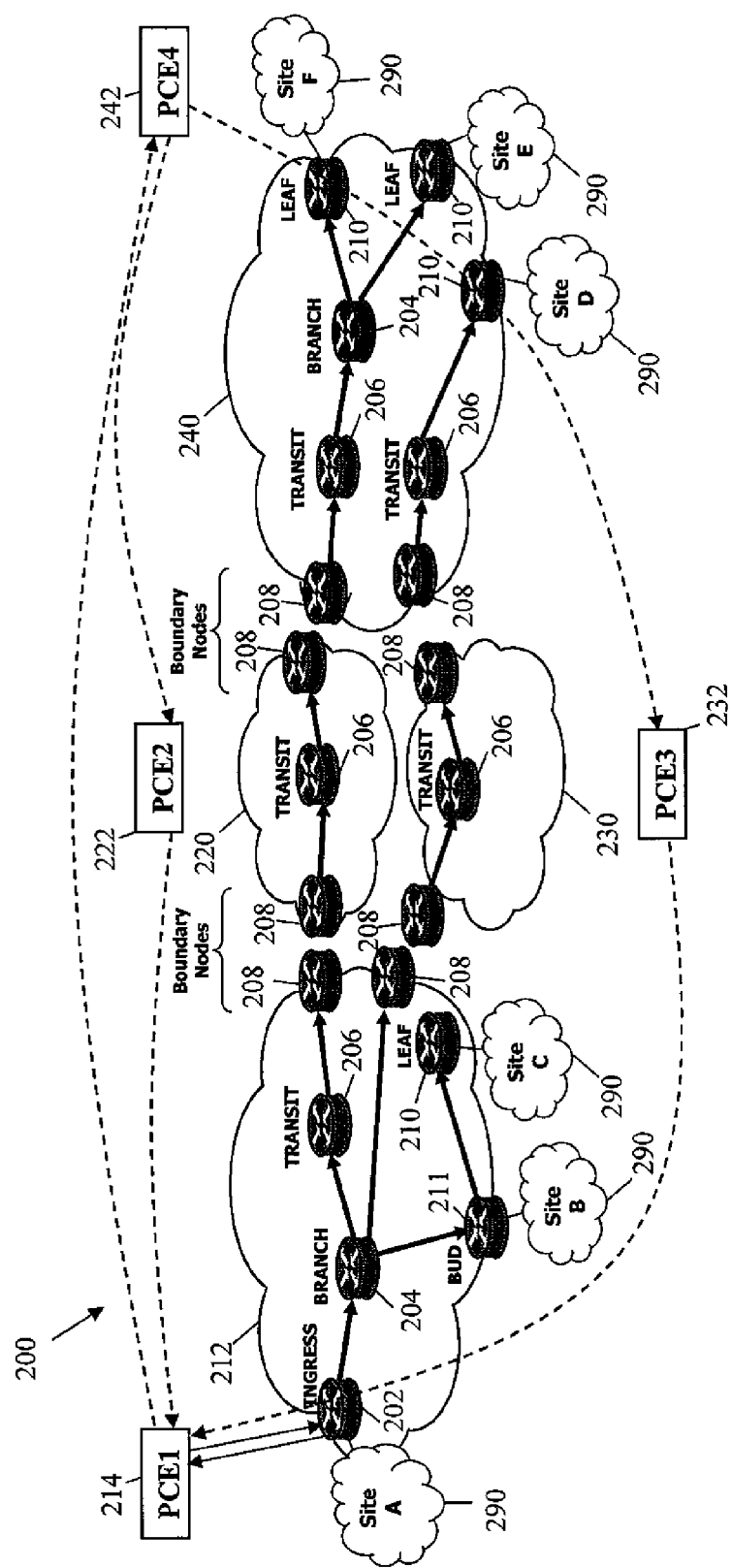
FIG. 2 is a schematic diagram of one embodiment of an inter-domain P2MP tree.

FIG. 2 illustrates an embodiment of an inter-domain P2MP tree 200, which may be established across a plurality of domains in a network, e.g. in the label switched network 110. The inter-domain P2MP tree may comprise a plurality of nodes across the domains, which may be connected via a plurality of paths and links (indicated by solid arrow lines). The nodes may be configured substantially similar to the nodes 112, and may comprise an ingress or source node 202, a plurality of branch nodes 204, a plurality of transit nodes 206, a plurality of BNs 208, and a plurality of leaf nodes 210. The source node 202 may be defined as the beginning of a P2MP tree. The branch nodes 204 may be defined as non-BNs that create a branch within the P2MP tree. The transit nodes 206 may be defined as non-BNs that do not create a branch within the P2MP tree. The BNs 208 may be defined as domain edge nodes or entry nodes that have at least one connection to another domain. The leaf nodes 210 may be defined as the ends of a P2MP tree. The bud nodes 211 may be defined as nodes that both are branch or transit nodes of the P2MP tree and are egress nodes of the P2MP tree. In some instances, the inter-domain P2MP tree 200 may also comprise at least one bud node 211. The nodes may be located in a plurality of domains associated with a plurality of PCEs, which may comprise a first domain 212 associated with a first PCE 214 (PCE1), a second domain 220 associated with a second PCE 222 (PCE2), a third domain 230 associated with a third PCE 232 (PCE3), and a fourth domain 240 associated with a fourth PCE 242 (PCE4). The ingress or source node 202, the leaf nodes 210, and the bud node 211 may be domain edge nodes coupled to a plurality of network sites 290.

The first domain 212 may comprise the source node 202, a branch node 204, a transit node 206, a leaf node 210, a bud node 211, and two BNs 208. The ingress or source node 202 may be coupled to a first network site 290 (site A) and the branch node 204, and may be configured to multicast traffic to the leaf nodes 210 via the path of the inter-domain P2MP tree 200. For example, the source node 202 may forward traffic from the site A, which may correspond to a service provider, to the branch node 204 along a link in the inter-domain P2MP tree 200. The branch node 204 may be coupled to the transit node 206, the bud node 211, and one of the BNs 208, and may be configured to multicast traffic from the source node 202 to the transit node 206, the bud node 211, and the BN 208 via a plurality of links in the tree. The transit node 206 may be coupled to another BN 208 and may be configured to forward the traffic from the branch node 204 to the BN 208 via a link in the tree.

The two BNs 208 may be individually coupled to a BN 208 in the second domain 220 and another BN 208 in the third domain 230 and may be configured to forward the traffic to the BNs 208 in the second domain 220 and the third domain 230 via corresponding links in the tree. The bud node 211 may be coupled to a third network site 290 (site B) and may be configured to forward the traffic from the branch node 204 to the site B. However, the bud node 211 may also be couple to the leaf node 210 and may forward traffic to the leaf node 210 via a link in the tree. The leaf node 210 may be coupled to a second network site 290 (site C) and may be configured to forward the traffic from the bud node 211 to the site C, which may correspond to a client.

The second domain 220 may comprise a transit node 206 and two BNs 208. The transit node 206 may be positioned between the two BNs 208 and may forward traffic between the two BNs 208 via links in the tree. The two BNs 208 may be coupled individually to a BN 208 in the first domain 212 and another BN 208 in the fourth domain 240, respectively, and may forward the multicast traffic from the first domain 212 to the fourth domain 240 via corresponding links in the tree. Similarly, the third domain 230 may comprise a transit node 206 and two BNs 208. The transit node 206 may be positioned between the two BNs 208 and may forward traffic between the two BNs 208 via links in the tree. The two BNs 208 may be coupled individually to a BN 208 in the first domain 212 and another BN 208 in the fourth domain 240, respectively, and may forward the multicast traffic from the first domain 212 to the fourth domain 240 via corresponding links in the tree.

The fourth domain 240 may comprise two BNs 208, two transit nodes 206, a branch node 204, and three leaf nodes 210. The two BNs 208 may be coupled individually to a BN 208 in the second domain 220 and another BN 208 in the third domain 230, respectively, and may forward the multicast traffic from the second domain 220 and the third domain 230 to the fourth domain 240 via corresponding links in the tree.

Each of the two transit nodes 206 may be individually coupled to one of the two BNs 208. However, one of the transit nodes 206 may be coupled to the branch node 204, and the other transit node 206 may be coupled to a one of the leaf nodes 210. Thus, the two transit nodes 206 may individually forward the traffic from the two BNs 208 to the branch node 204 and the leaf node 210 via corresponding links in the tree. The branch node 204 may also be coupled to two other leaf nodes 210, and may multicast the traffic from one of the transit nodes 206 to the two leaf nodes 210. Each of the three leaf nodes 210 in the fourth domain 240 may be coupled to a different network site 290 (site D, site E, and site F), respectively, and may forward the traffic to the corresponding network site 290.

In an embodiment, the computation of the inter-domain P2MP tree 200 paths between the source node 202 and the leaf nodes 210 may be distributed between the first PCE 214, the second PCE 222, the third PCE 232, and/or the fourth PCE 242. For instance, the first PCE 214 may receive a request message from a PCC in the first domain 212, which may be the ingress or source node 202, to compute the inter-domain P2MP tree 200. The request message may indicate that the computation is related to an inter-domain P2MP path. Additionally, the message may comprise path computation information, which may be used to calculate the paths across the domains. The first PCE 214, the second PCE 222, the third PCE 232, and the fourth PCE 242 may communicate with each other to share the path computation information and perform a combined path computation. The PCEs may also share information during path computation to synchronize information and obtain an improved P2MP path computation.

In an embodiment, the inter-domain P2MP tree 200 computation may comprise determining (e.g. at the first PCE 214) which domains may be used to establish end-to-end paths between the source node 202 and each leaf node 210. The inter-domain P2MP tree 200 computation may also comprise selecting the BNs 208 to connect the paths across the domains, selecting the branch nodes 204 to branch out the paths in the tree, and computing a minimum cost tree across the domains according to some metric, such as minimum cost, shortest path, minimizing a load on a most used link, maximizing a load on a least used link, balancing the loads on a plurality of links, or any other metric. In some embodiments, the tree computation may also comprise computing a backup tree, which may comprise a plurality of different nodes, paths, and/or links that may be different from the components in the primary computed tree.

The P2MP path computation may be performed in separate procedures: a core tree computation that may be performed jointly by the PCEs, and a prior, concurrent, or subsequent sub-tree computation that may be performed individually by at least one of the PCEs. The PCEs may compute the core tree across the domains, which may extend from the source node 202 in the first domain 212 to the BNs 208 in each of the remaining domains. The core tree may be established by computing a plurality of inter-domain P2P paths across the domains. For instance, the core tree may be computed using a BRPC technique, e.g. without sharing domain private information between the domains. The sub-trees may be computed by at least some of the PCEs, which may be associated with the domains that comprise the leaf nodes 210, e.g. the first PCE 214 and the fourth PCE 242. The sub-trees may extend from the BN 208 to the leaf nodes 210 in the corresponding domains, e.g. the first domain 212 and the fourth domain 240. The core tree and the sub-tree may be computed based on a request message, which may comprise a bit that may be set, e.g. in a request object, to indicate a core tree computation or a sub-tree computation request.

The P2MP path computation may be configured to preserve confidentiality information across the domains, which may be required when the domains are managed by different service providers. For example, the sub-trees that comprise the leaf nodes 210 in each domain may be hidden from the other domains. Further, computing the core tree and the sub-trees separately, e.g. using separate procedures and/or techniques, may improve inter-domain P2MP tree computation in terms of efficiency, scalability, and/or resource sharing, e.g. in comparison to the Steiner P2MP tree computation approach.

Figure 3:
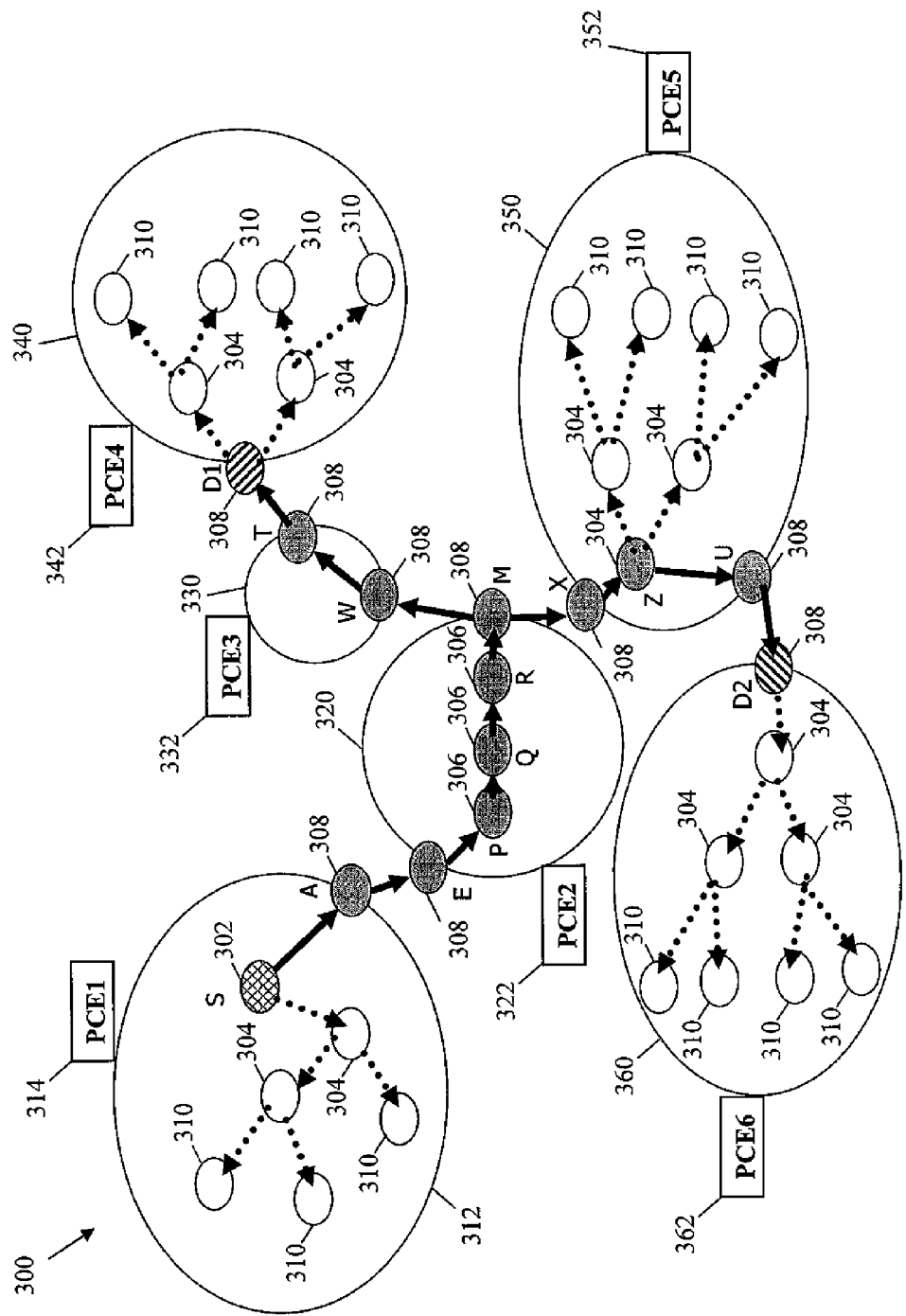
FIG. 3 is a schematic diagram of one embodiment of a core tree coupled to a plurality of sub-trees.

FIG. 3 illustrates an embodiment of a core tree and a plurality of sub-trees in an inter-domain P2MP tree 300. The core tree and sub-trees may be computed across a plurality of domains in a network, e.g. in the label switched network 110. The core tree may comprise a plurality of nodes across the domains, which may be connected via a plurality of paths and links (indicated by solid arrow lines). The nodes of the core tree may comprise a source node 302 (S), a branch node 308 (M), a plurality of transit nodes 306, a plurality of BNs 308. The sub-trees may comprise a plurality of branch nodes 304 and a plurality of leaf nodes 310, which may be connected via a plurality of paths and links (indicated by dotted arrow lines). The nodes may be located in a plurality of domains associated with a plurality of PCEs, which may comprise a first domain 312 associated with a first PCE 314 (PCE1), a second domain 320 associated with a second PCE 322 (PCE2), a third domain 330 associated with a third PCE 332 (PCE3), and a fourth domain 340 associated with a fourth PCE 342 (PCE4).

In the first domain 312, the core tree may comprise the source node 302 (S) and a BN 308 (A) coupled to the source node 302. The first domain 312 may also comprise a first sub-tree that comprises two branch nodes 304 and three leaf nodes 310. In the first sub-tree, one of the branch nodes 304 may be coupled to the source node 302 (S), to one of the leaf nodes 310, and to another branch node 304, which may be coupled to the other two leaf nodes 310. In the second domain 320, the core tree may comprise two BNs 308 (E and M) and three transit nodes 306 (P, Q, and R) positioned between the BNs 308 E and M. The BN 308 E in the second domain 320 may also be coupled to the BN 308 A in the first domain 312. Additionally, the core tree may comprise two BNs 308 (W and T) in the third domain 330, and a BN 308 (D1) in the fourth domain 340. The BN 308 W in the third domain 330 may be coupled to the BN 308 M in the second domain 320. The fourth domain 340 may also comprise a second sub-tree that comprises two branch nodes 304 and four leaf nodes 310. In the second sub-tree, each branch node 304 may be coupled to two of the leaf nodes 310 and to the BN 308 D1 of the core tree, which may also be coupled to the BN 308 T in the third domain 330.

In the fifth domain 350, the core tree may comprise two BNs 308 (X and U) and a branch node 304 (Z), which may be positioned between the two BNs 308 X and U. The fifth domain 350 may also comprise a third sub-tree that comprises two branch nodes 304 and four leaf nodes 310. In the third sub-tree, each branch node 304 may be coupled to two of the leaf nodes 310 and to the branch node 304 Z of the core tree. The BN 308 X in the fifth domain 350 may also be coupled to the BN 308 M in the second domain 320. In the sixth domain 360, the core tree may comprise a BN 308 (D2) coupled to BN 308 U and a fourth sub-tree that comprises three branch nodes 304 and four leaf nodes 310. In the fourth sub-tree, one of the branch nodes 304 may be coupled to the BN 308 D2 of the core tree and to two other branch nodes 304, which may each be coupled to two leaf nodes 310.

The core tree in the first domain 312, the second domain 320, the third domain 330, the fourth domain 340, the fifth domain 350, and the sixth domain 360 may be computed by the first PCE 314, the second PCE 322, the third PCE 332, the fourth PCE 342, the fifth PCE 352, the sixth PCE 362, or combinations thereof. In a specific embodiment, the first sub-tree in the first domain 312 may be computed by the first PCE 314, the second sub-tree in the fourth domain 340 may be computed by the fourth PCE 342, the third sub-tree in the fifth domain 350 may be computed by the fifth PCE 352, and the fourth sub-tree in the sixth domain 360 may be computed by the sixth PCE 362.

The topology of the PCEs associated with the domains of the inter-domain P2MP tree 300 may be organized in a distributed PCE topology. The distributed PCE topology may comprise a root PCE, a transit PCE, a branch PCE, and a leaf PCE. The root PCE may be associated with the domain that comprises the source node 302, e.g. the first PCE 314. The transit PCE may be associated with the domain that transfers the traffic from the source node 302 to another domain, e.g. the third PCE 332. The branch PCE may be associated with the domains that forward the traffic from the source node 302 to a plurality of other domains, e.g. the second PCE 322. The leaf PCE may be associated with the domains that comprise a leaf node, e.g. the fourth PCE 342, the fifth PCE 352, and the sixth PCE 362. The distributed PCE topology may be communicated between the PCEs, e.g. during the discovery period of the PCEs or via a path computation request to each PCE.

As shown in FIG. 3, a core tree may comprise a plurality of paths that extend the domains of the P2MP tree and may comprise at least one BN (e.g. BN 308) in each domain. The ingress or source node of the P2MP tree (e.g. source node 302 S in the first domain 312) may be the root of the core tree and the BNs (e.g. BNs 308) in the domains that comprise the leaf nodes of the P2MP tree (e.g. the fourth domain 340, and the sixth domain 360) may be the leaf nodes of the core tree. The transit nodes (e.g. transit nodes 306) and branch nodes (e.g. branch nodes 304) of the P2MP tree may also be the branch nodes and transit nodes of the core tree.

In an embodiment, the core tree may be computed by building the core tree BNs, e.g. selecting the BNs 308 of the core tree. As such, the quantity of BNs may be reduced or minimized to improve path computation efficiency. Building the core tree BNs may be achieved using a BRPC procedure and a Virtual Shortest Path Tree (VSPT) procedure. The VSPT procedure may comprise computing a tree, which may have an egress at the root of the core tree and an ingress at a leaf of the core tree. A primary PCE (e.g. the first PCE 314), which may receive a request from a PCC (e.g. the source node 302 S), may compute a plurality of potential core trees using the VSPT procedure, e.g. by communicating with other PCEs associated with multiple domains. The primary PCE may then determine an optimal core tree, e.g. according to cost and/or bandwidth requirements. Subsequently, a plurality of sub-trees may be built to connect the leaf nodes of the core tree, which may be BNs in the core tree, to the destination nodes (e.g. leaf nodes 310).

Figure 4:
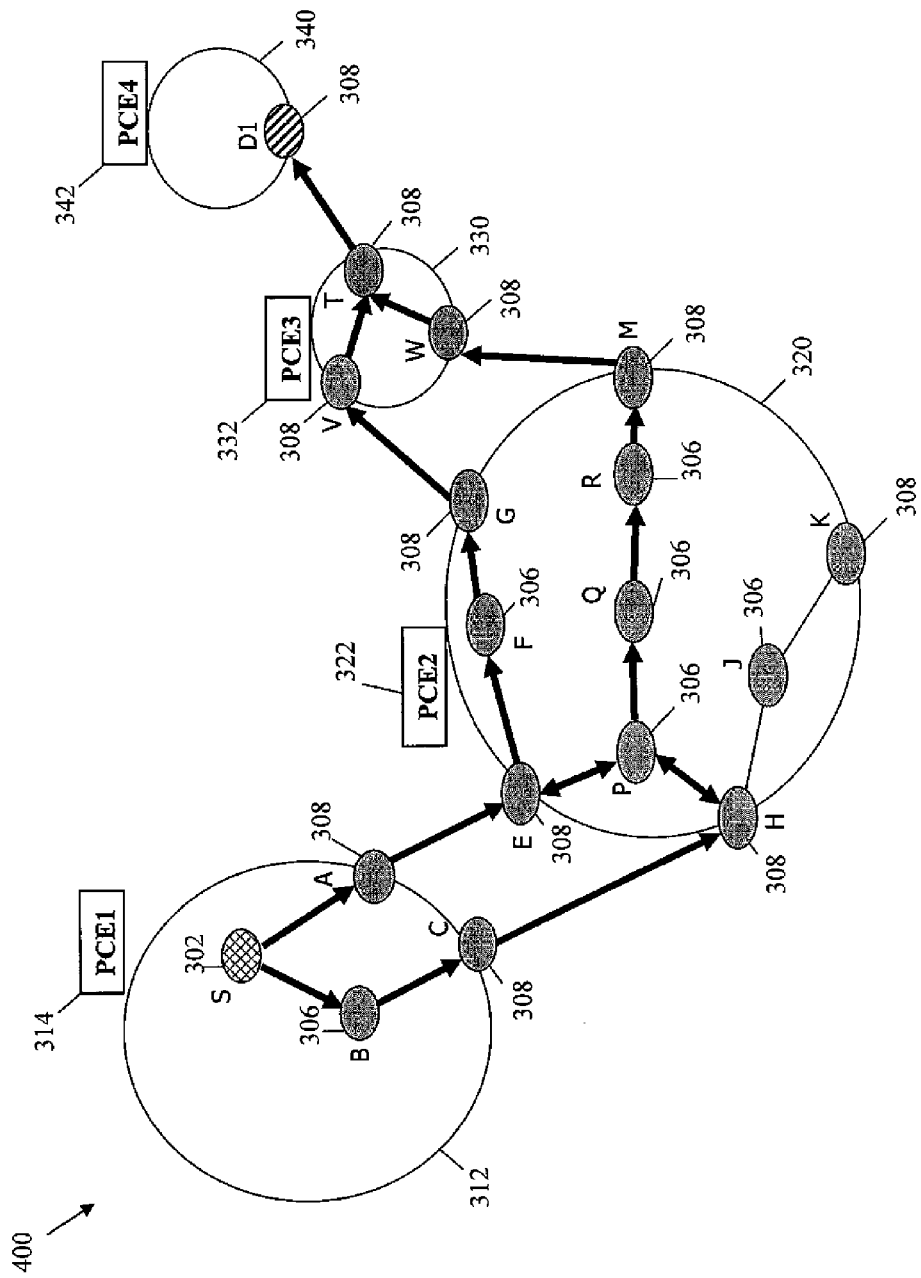
FIG. 4 is a schematic diagram of one embodiment of a plurality of paths across multiple domains.

FIG. 4 illustrates an embodiment of a plurality of paths 400 across multiple domains. The paths 400 may be computed to obtain the core tree in the inter-domain P2MP tree 300. The paths 400 may be considered across the first domain 312, the second domain 320, the third domain 330, and the fourth domain 340, e.g. by the first PCE 314, the second PCE 322, the third PCE 332, and/or the fourth PCE 342. The paths 400 may comprise some of the nodes in the core tree, which may include the source node 302 S, the BNs 308 A, E, M, W, T, and D1, and the transit nodes 306 P, Q, and R. Additionally, in the first domain 312, the paths 400 may comprise a transit node 306 (B) coupled to the source node 302 S, and a BN 308 (C) coupled to the transit node 306 B. In the second domain 320, the paths 400 may also comprise two transit nodes 306 (F and J) and three BNs 308 (H, G, and K). The transit node 306 F may be positioned between the BN 308 E and the BN 308 G, and the transit node 306 J may be positioned between the BNs 308 H and K. The paths 400 may also comprise a BN 308 (V) in the third domain 330, which may be coupled to the BN 308 G.

The paths 400 may comprise end-to-end paths between the source node 302 S in the first domain 312 and the BN 308 D1 in the fourth domain 340. The BN 308 D1 may be an entry (ingress edge) node to the fourth domain 340, which may be one of the domains that comprise destination or leaf nodes of the inter-domain P2MP tree 300. The end-to-end paths between the source node 302 S and the BN 308 D1 may be used to compute a branch or portion of the core tree in the inter-domain P2MP tree 300, which may be subsequently extended and linked to the leaf nodes 310 in the fourth domain 340 via a sub-tree, as described below. Similarly, the source node 302 S may also be extended and linked to the leaf nodes 310 in the first domain 312 via a sub-tree.

Figure 5:
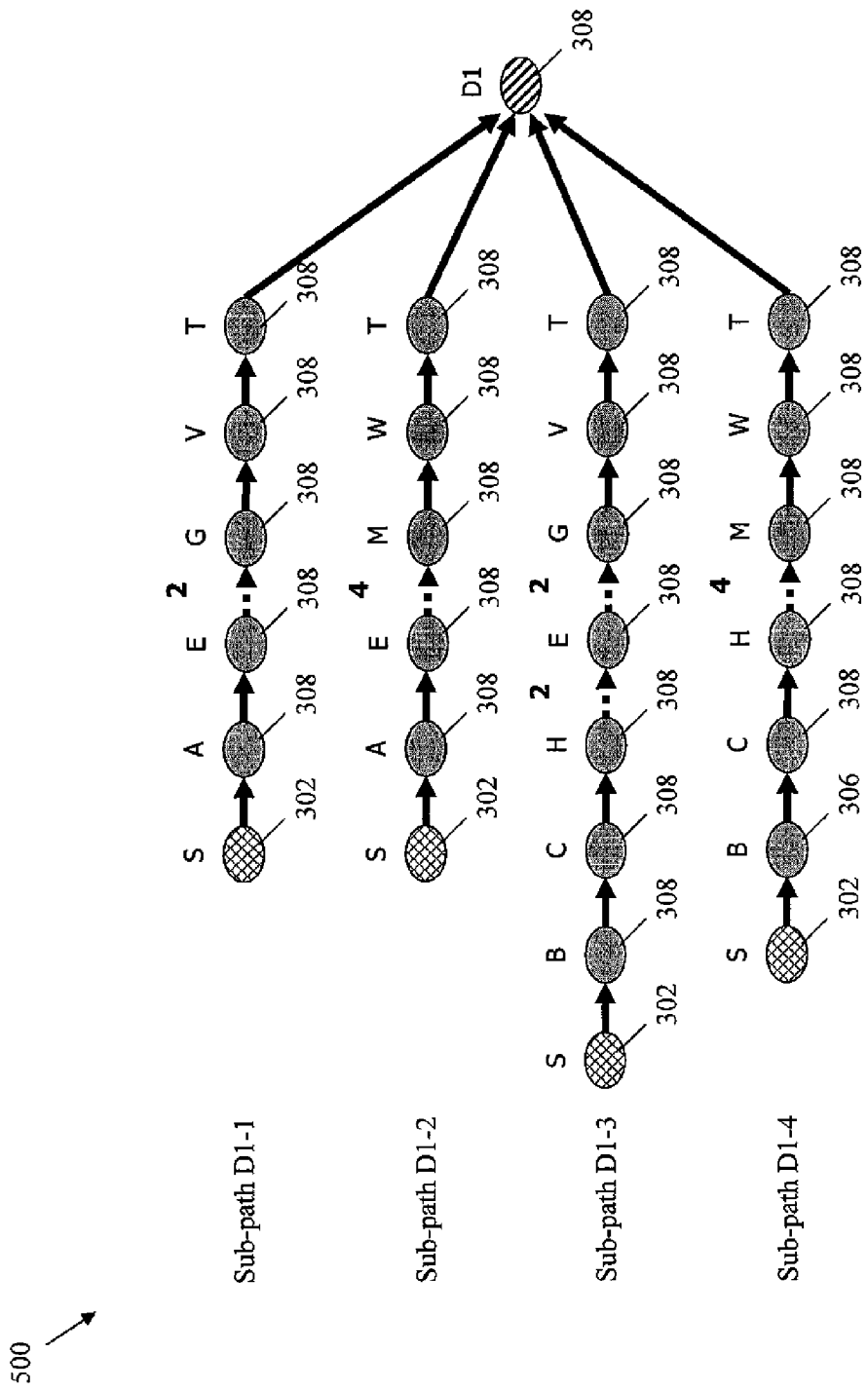
FIG. 5 is a schematic diagram of one embodiment of computed sub-paths across multiple domains.

FIG. 5 illustrates an embodiment of a plurality of computed sub-paths 500 from the paths 400, which may be used to compute the core tree in the inter-domain P2MP tree 300. The sub-paths 500 may be established across the first domain 312, the second domain 320, the third domain 330, and the fourth domain 340, e.g. by the first PCE 314, the second PCE 322, the third PCE 332, and/or the fourth PCE 342. The sub-paths 500 may comprise at least some of the nodes in the paths 400. Specifically, the sub-paths 500 may comprise a first sub-path (D1-1), a second sub-path (D1-2), a third sub-path (D1-3), and a fourth sub-path (D1-4), which may each represent an end-to-end path from the source node 302 S to the BN 308 D1. In FIG. 5, the direct links between the nodes are illustrated by solid line arrows and the indirect links are illustrated by dashed line arrows to indicate missing nodes.

The first sub-path D1-1 may comprise the source node 302 S, the BN node 308 D1, and a plurality of boundary nodes 308 A, E, G, V, and T between the source node 302 S and the BN node 308 D1. The first sub-path D1-1 may also comprise the transit node 306 F (not shown) between the BNs 308 E and G, which may correspond to about two hops in the path. The second sub-path D1-2 may comprise the source node 302 S, the BN node 308 D1, and a plurality of boundary nodes 308 A, E, M, W, and T between the source node 302 S and the BN node 308 D1. The second sub-path D1-2 may also comprise the transit nodes 306 P, Q, and R (not shown) between the BNs 308 E and M, which may correspond to about four hops in the path. The third sub-path D1-3 may comprise the source node 302 S, the BN node 308 D1, the transit node 306 B, and a plurality of boundary nodes 308 C, H, E, G, V, and T between the source node 302 S and the BN node 308 D1. The third sub-path D1-3 may also comprise the transit node 306 P (not shown) between the BNs 308 H and E, which may correspond to about two hops in the path, and the transit node 306 F (not shown) between the BNs 308 E and G, which may also correspond to about two hops. The fourth sub-path D1-4 may comprise the source node 302 S, the BN node 308 D1, the transit node 306 B, and a plurality of boundary nodes 308 C, H, M, W, and T between the source node 302 S and the BN node 308 D1. The fourth sub-path D1-4 may also comprise the transit nodes 306 P, Q, and R (not shown) between the BNs 308 H and M, which may correspond to about four hops in the path.

The sub-paths 500 may be computed using the VSPT procedure. Specifically, the fourth PCE 342 may first compute or select the BN 308 D1 in the fourth domain 340 and send this information to the third PCE 332 and/or any of the other PCEs. The third PCE 332 may then use this information to compute a first path comprising the BNs 308 V, T, and D1, and a second path comprising the BNs 308 W, T, and D1. The third PCE 332 may send this information to the second PCE 322 and/or any of the other PCEs. The second PCE 322 may then use this information to update and/or compute a first path comprising the nodes E, F, G, V, T, and D1, a second path comprising the nodes E, P, Q, R, M, W, T, and D1, a third path comprising the nodes H, P, E, F, G, V, T, D1, and a fourth path comprising the nodes H, P, Q, R, M, W, T, and D1. The second PCE 322 may send this information to the first PCE 314 and/or any of the other PCEs. The first PCE 314 may then use this information to compute the first sub-path D1-1 comprising the nodes S, A, E, F, G, V, T, and D1, the second sub-path D1-2 comprising the nodes S, A, E, P, Q, R, M, W, T, and D1, the third sub-path D1-3 comprising the nodes S, B, C, H, P, E, F, G, V, T, and D1, and the fourth sub-path D1-4 comprising the nodes S, B, C, H, P, Q, R, M, W, T, and D1.

As such, the first sub-path D1-1 may comprise about seven hops (e.g. connections) between the nodes S and D1, the second sub-path D1-2 may comprise about nine hops between the nodes S and D1, the third sub-path D1-3 may comprise about ten hops between the nodes S and D1, and the fourth sub-path D1-4 may comprise about ten hops between the nodes S and D1. The sub-paths 500 may be received by the first PCE 314 and may be considered to compute the core tree in the inter-domain P2MP tree 300, where at least one of the sub-paths 500 may be selected as a branch or a portion of the core tree, as described below.

Figure 6:
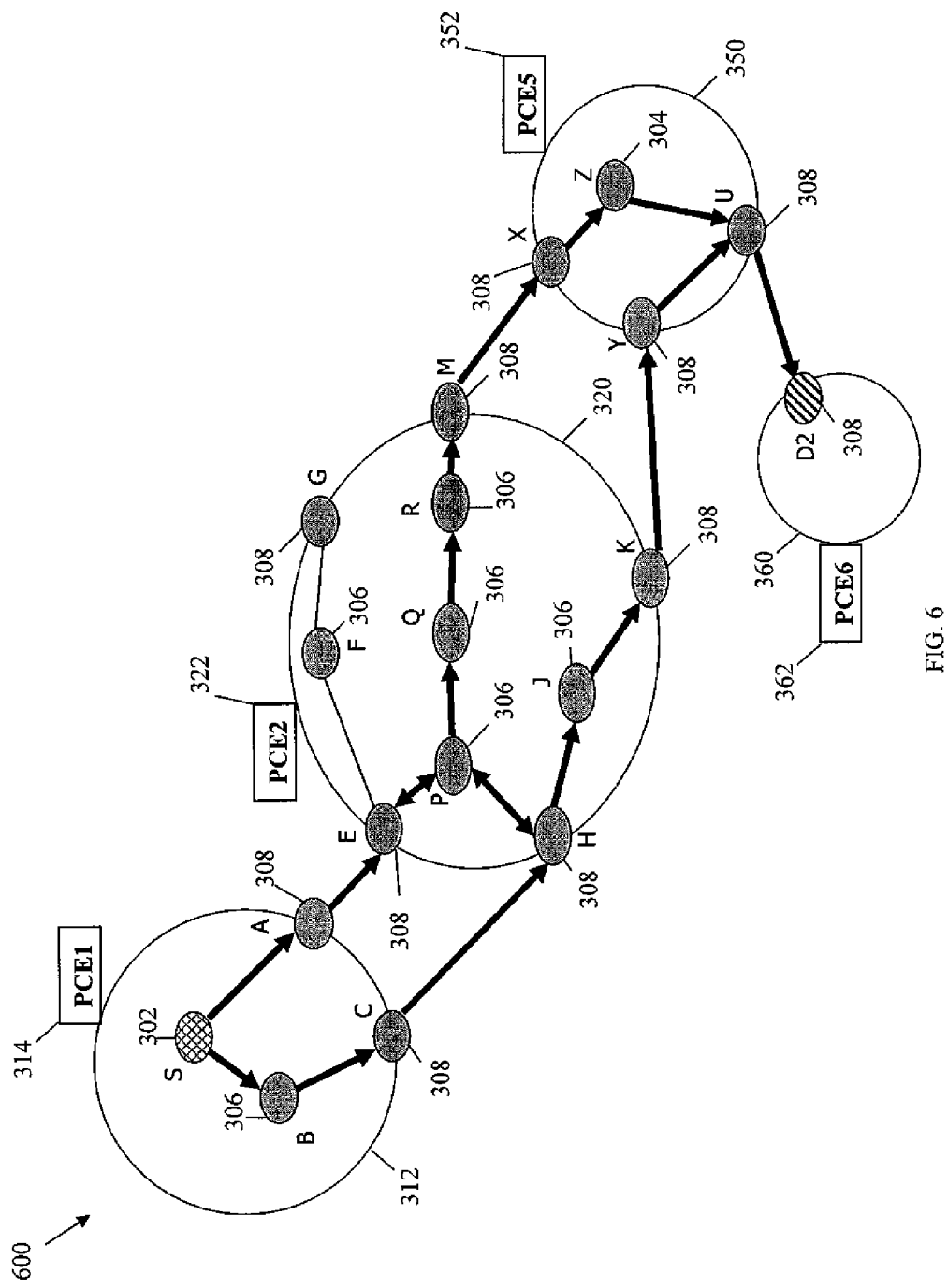
FIG. 6 is a schematic diagram of another embodiment of a plurality of paths across multiple domains.

FIG. 6 illustrates an embodiment of a plurality of additional paths 600, which may also be computed to obtain the core tree in the inter-domain P2MP tree 300. The paths 600 may be considered across the first domain 312, the second domain 320, the fifth domain 350, and the sixth domain 360, e.g. by the first PCE 314, the second PCE 322, the fifth PCE 352, and/or the sixth PCE 362. The paths 600 may comprise at least some of the nodes in the paths 400. The nodes of the paths 600 may comprise the source node 302 S, the BNs 308 A, E, M, X, U, and D2, the transit nodes 306 P, Q, and R, and the branch node 304 Z. Additionally, the paths 600 may comprise the transit node 306 B and the BN 308 C in the first domain 312 and the transit nodes 306 F and J and the BNs 308 H, G, and K in the second domain 320, which may be arranged as shown in FIG. 6. The paths 600 may also comprise a BN 308 (Y) in the fifth domain 350, which may be coupled to the BNs 308 K and U.

The paths 600 may comprise end-to-end paths between the source node 302 S in the first domain 312 and the BN 308 D2 in the sixth domain 360. The BN 308 D2 may be an entry (ingress edge) node to the sixth domain 360, which may be one of the domains that comprise destination or leaf nodes of the inter-domain P2MP tree 300. The end-to-end paths between the source node 302 S and the BN 308 D2 may be used to compute a branch or portion of the core tree in the inter-domain P2MP tree 300, which may be subsequently extended and linked to the leaf nodes 310 in the sixth domain 360 via a sub-tree, as described below. Similarly, the branch node 304 Z may also be extended and linked to the leaf nodes 310 in the fifth domain 350 via a sub-tree.

Figure 7:
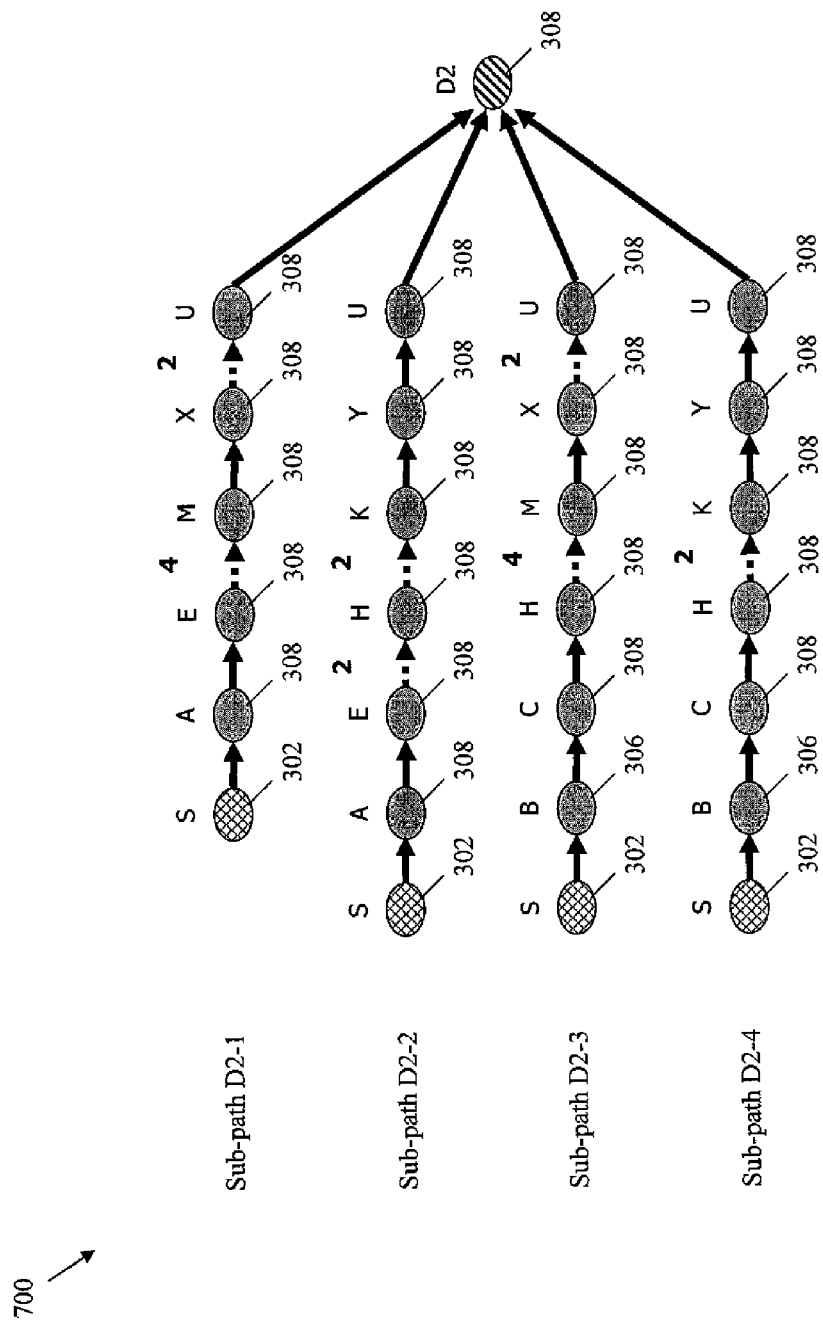
FIG. 7 is a schematic diagram of another embodiment of computed sub-paths across multiple domains.

FIG. 7 illustrates an embodiment of a plurality of computed sub-paths 700 in the paths 600, which may be used to compute the core tree in the inter-domain P2MP tree 300. The sub-paths 700 may be computed across the first domain 312, the second domain 320, the fifth domain 350, and the sixth domain 360, e.g. by the first PCE 314, the second PCE 322, the fifth PCE 352, and/or the sixth PCE 362. The sub-paths 700 may comprise the same nodes in the paths 600. Specifically, the sub-paths 700 may comprise a first sub-path (D2-1), a second sub-path (D2-2), a third sub-path (D2-3), and a fourth sub-path (D2-4), which may each represent an end-to-end path from the source node 302 S to the BN 308 D2.

The first sub-path D2-1 may comprise the source node 302 S, the BN node 308 D2, and a plurality of boundary nodes 308 A, E, M, X, and U between the source node 302 S and the BN node 308 D2. The first sub-path D2-1 may also comprise the transit nodes 306 P, Q, and R (not shown) between the BNs 308 E and M, which may correspond to about four hops in the path. In FIG. 7, the direct links between the nodes are illustrated by solid line arrows and the indirect links are illustrated by dashed line arrows. The second sub-path D2-2 may comprise the source node 302 S, the BN node 308 D2, and a plurality of boundary nodes 308 A, E, H, K, Y, and U between the source node 302 S and the BN node 308 D2. The second sub-path D2-2 may also comprise the transit node 306 P (not shown) between the BNs 308 E and H, which may correspond to about two hops in the path, and the transit node 306 J (not shown) between the BNs 308 H and K, which may also correspond to about two hops. The third sub-path D2-3 may comprise the source node 302 S, the BN node 308 D2, the transit node 306 B, and a plurality of boundary nodes 308 C, H, M, X, and U between the source node 302 S and the BN node 308 D2. The third sub-path D2-3 may also comprise the transit nodes 306 P, Q, and R (not shown) between the BNs 308 H and M, which may correspond to about four hops in the path, and the branch node 304 Z (not shown) between the BNs 308 X and U, which may correspond to about two hops. The fourth sub-path D2-4 may comprise the source node 302 S, the BN node 308 D2, the transit node 306 B, and a plurality of boundary nodes 308 C, H, K, Y, and U between the source node 302 S and the BN node 308 D2. The fourth sub-path D2-4 may also comprise the transit node 306 J (not shown) between the BNs 308 H and K, which may correspond to about two hops.

The sub-paths 700 may be computed using the VSPT procedure. Accordingly, the sixth PCE 362 may first compute or select the BN 308 D2 in the sixth domain 360 and send this information to the fifth PCE 352 and/or any of the other PCEs. The fifth PCE 352 may then use this information to compute a first path comprising the nodes X, Z, U, and D2, and a second path comprising the BNs 308 Y, U, and D2. The fifth PCE 352 may send this information to the second PCE 322 and/or any of the other PCEs. The second PCE 322 may then use this information to compute the first sub-path comprising the nodes E, P, Q, R, M, X, Z, U and D2, the second sub-path comprising the nodes E, P, H, J, K, Y, U, and D2, the third sub-path comprising the nodes H, P, Q, R, M, X, Z, U, and D2, and the fourth sub-path comprising the nodes H, J, K, Y, U, and D2. The second PCE 322 may send this information to the first PCE 314 and/or any of the other PCEs. The first PCE 314 may then use this information to compute the first sub-path D2-1 comprising the nodes S, A, E, P, Q, R, M, X, Z, U and D2, the second sub-path D2-2 comprising the nodes S, A, E, P, H, J, K, Y, U and D2, the third sub-path D2-3 comprising the nodes S, B, C, H, P, Q, R, M, X, Z, U, and D2, and the fourth sub-path D2-4 comprising the nodes S, B, C, H, J, K, Y, U and D2.

As such, the first sub-path D2-1 may comprise about ten hops between the nodes S and D2, the second sub-path D2-2 may comprise about nine hops between the nodes S and D2, the third sub-path D3-3 may comprise about 11 hops between the nodes S and D2, and the fourth sub-path D4-4 may comprise about eight hops between the nodes S and D2. The sub-paths 700 may be considered by the first PCE 314 to compute the core tree in the inter-domain P2MP tree 300, where at least one of the sub-paths 700 may be selected as a branch or a portion of the core tree, as described below.

For instance, at least a portion of any of the sub-paths 700 may be merged with at least a portion of any of the sub-paths 400 to obtain at least a portion of the core tree in the inter-domain P2MP tree 300. For example, the sub-paths may be merged to obtain end-to-end paths from the source node 302 S to the leaf nodes 310 that have a minimum number of hops and hence minimum cost. In an embodiment, an algorithm may be used to merge the sub-paths computed using the VSPT procedure and hence obtain a core tree. According to the algorithm, each computed sub-path may be merged with another computed sub-path, and the cost of the resulting merged sub-path may be calculated. For example a sub-path D1-$i$ from the sub-paths 500 may be merged with a sub-path D2-$j$ from the sub-paths 700, where i and j are integer values that may be changed to select all the sub-paths 500 and 700 that may be merged. The process may be repeated until the costs of all possible merged sub-paths are calculated. Finally, the merged sub-path that has the least cost may be selected to establish the core tree. In an embodiment, the cost of each merged sub-path may be equal to the quantity of hops of the merged sub-path. However, in other embodiments, other criteria may be used to evaluate the requirements of each path, such as bandwidth and/or quality of service (QoS) requirements.

In an embodiment, the algorithm for merging the sub-paths 500 and 700 and obtaining the core tree may comprise the following instructions:

1—Take a sub-path(D1-$i$) from VSPT(D1) and a sub-path (D2-$j$) from VSPT(D2).
2—Merge the sub-path(D1-$i$) and the sub-path(D2-$j$) into a Core Tree(D1-$i$-D2-$j$).
3—Compute the cost of the Core Tree(D1-$i$-D2-$j$).
4—Repeat (1) to (3) for all i and j combinations to generate all the possible Core Trees.
5—Evaluate and identify the Core Tree with the minimum cost among all the Core Trees.

Figure 8:
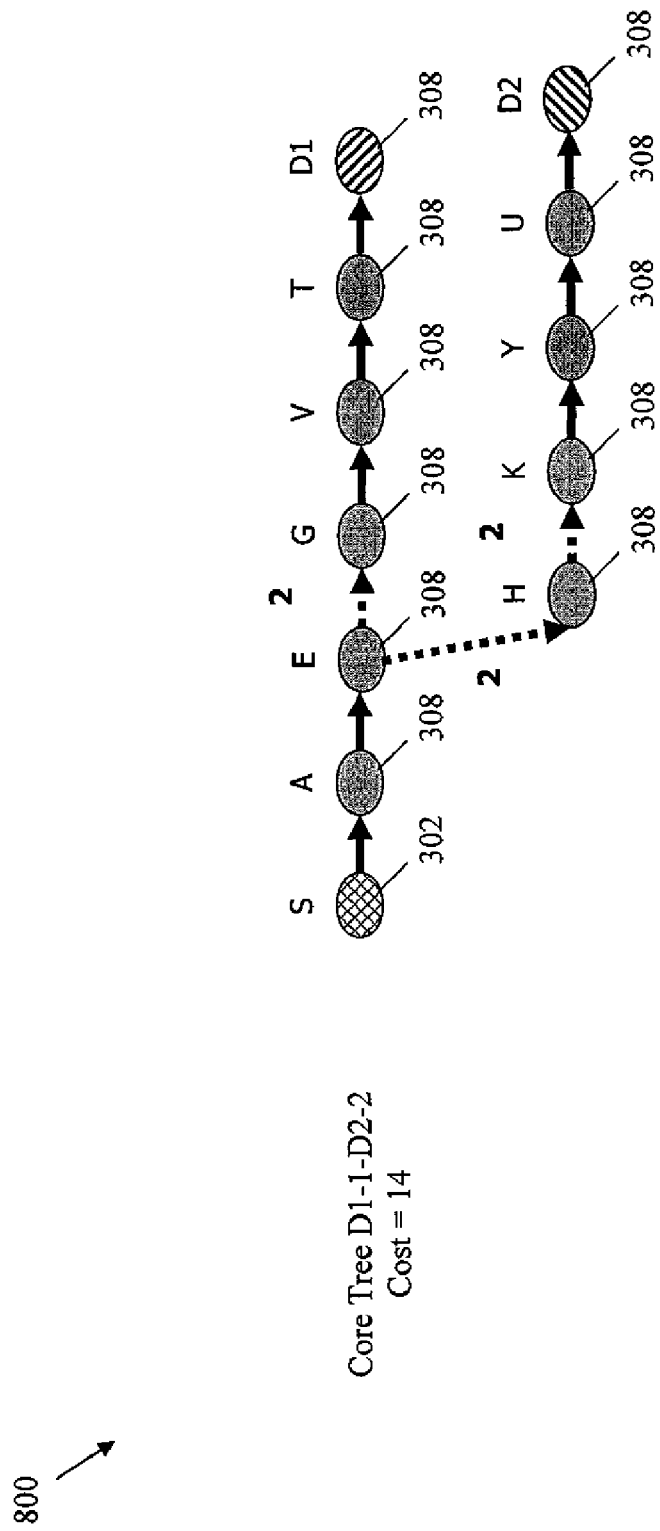
FIG. 8 is a schematic diagram of one embodiment of a merged sub-path across multiple domains.

FIG. 8 illustrates an embodiment of a merged sub-path 800, which may be obtained by merging at least some portions of the sub-paths 500 and the sub-paths 700 to compute the core tree in the inter-domain P2MP tree 300. The merged sub-path 800 may be computed across the first domain 312, the second domain 320, the third domain 330, the fourth domain 340, the fifth domain 350, and the sixth domain 360, e.g. by the first PCE 314. The merged sub-path 800 may comprise at least some of the nodes in the sub-paths 500 and the sub-paths 700. Specifically, the merged sub-path 800 may comprise the first sub-path D1-1 and a portion of the second sub-path D2-2. The merged sub-path 800 may comprise the nodes S, A, E, F, G, V, T, and D1 in the first sub-path D1-1 and the nodes P, H, J, K, Y, U, and D2 from the second sub-path D2-2, which may share the nodes S, A, and E with the first sub-path D1-1. Some of the nodes of the merged sub-path 800 are not shown in FIG. 8, e.g. the nodes F, P, and J. The direct links between the nodes are illustrated by solid line arrows and the indirect links are illustrated by dashed line arrows to indicate the missing nodes. The merged sub-path 800 may comprise about 14 hops between the source node 302 S and the BNs 308 D1 and D2.

Figure 9:
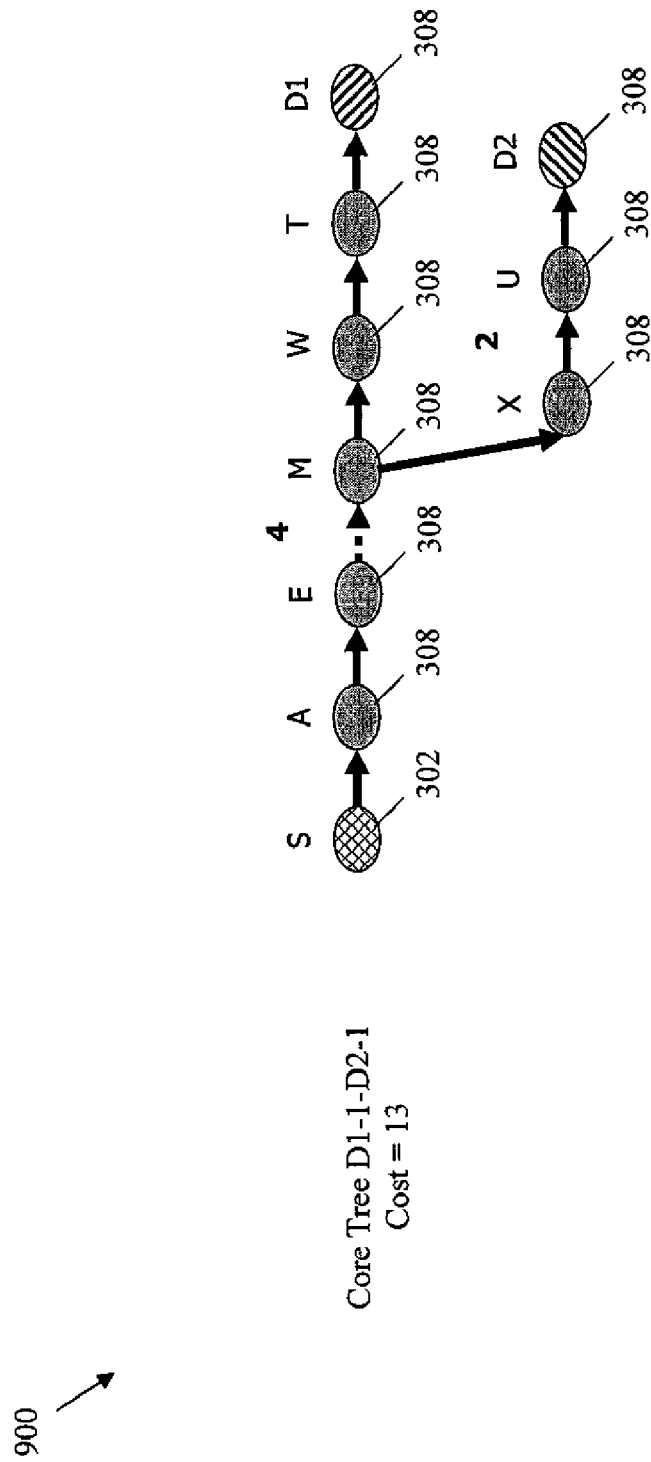
FIG. 9 is a schematic diagram of another embodiment of a merged sub-path.

FIG. 9 illustrates an embodiment of another merged sub-path 900, which may be obtained by merging at least some portions of the sub-paths 500 and the sub-paths 700 to compute the core tree in the inter-domain P2MP tree 300. Similar to the merged sub-path 800, the merged sub-path 900 may be computed across the domains, e.g. by the first PCE 314 and may comprise at least some of the nodes in the sub-paths 500 and the sub-paths 700. Specifically, the merged sub-path 900 may comprise the second sub-path D1-2 and a portion of the first sub-path D2-1. The merged sub-path 900 may comprise the nodes S, A, E, P, Q, R, M, W, T, and D1 in the second sub-path D1-2 and the nodes X, U, and D2 from the first sub-path D2-1, which may share the nodes S, A, E, P, Q, R, and M with the second sub-path D1-2. Some of the nodes of the merged sub-path 900 are not shown in FIG. 9, e.g. the nodes P, Q, and R (which are indicated using a dashed arrow line). The direct links between the nodes are illustrated by a solid line arrow and the indirect links are illustrated by a dashed line arrow to indicate the missing nodes. The merged sub-path 900 may comprise about 12 hops between the source node 302 S and the BNs 308 D1 and D2. Since the merged sub-path 900 may comprise fewer hops and hence may have less cost than the merged sub-path 800, the merged sub-path 900 may be selected to establish the core tree in the inter-domain P2MP tree 300.

Figure 10:
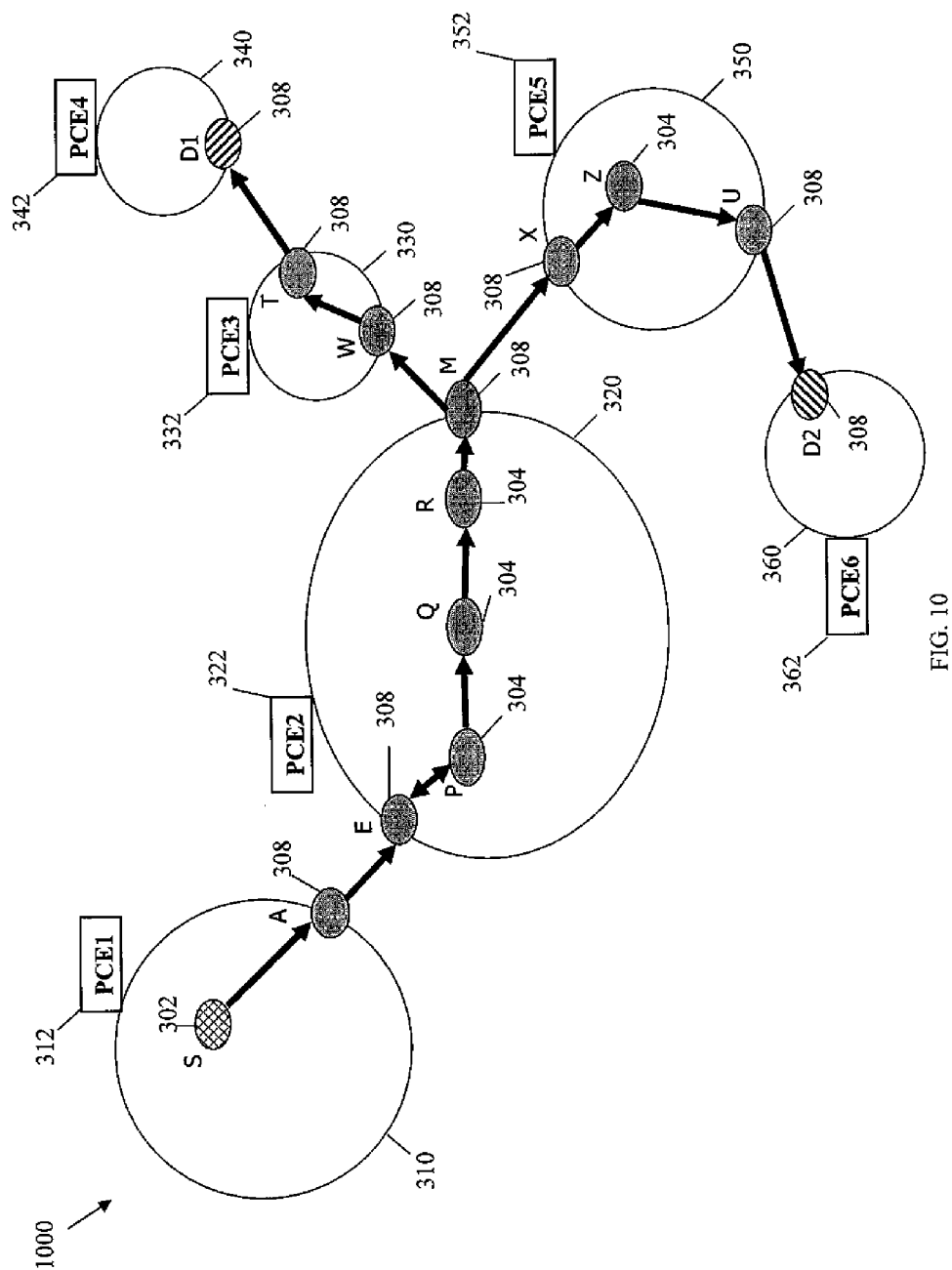
FIG. 10 is a schematic diagram of one embodiment of a computed core tree.

FIG. 10 illustrates an embodiment of a computed core tree 1000, which may be obtained by computing and selecting the merged sub-path 900 from the sub-paths 500 and 700. The computed core tree 1000 may also be part of the inter-domain P2MP tree 300 and may extend across the domains of the inter-domain P2MP tree as shown in FIG. 10. The core tree 1000 may comprise portions of the paths 400 and 600, which may connect between the source node 302 S and the BNs 308 D1 and D2. The remaining portions of the paths 400 and 600 may be removed or pruned during the core tree computation procedure, e.g. using the BRPC and VSPT procedures as described above.

In an embodiment, to complete the inter-domain P2MP tree computation, a plurality of sub-trees that comprise the destination or leaf nodes may be computed and then combined with a core tree. The sub-tree may be computed in each domain that comprises the leaf nodes, e.g. independent of the sequence of domains with respect to the core tree and/or the inter-domain P2MP tree. The sub-tree may be computed and optimized, e.g. based on an objective function (OF), which may comprise at least one optimization criterion that may be used to compute a path (e.g. path cost minimization) or to synchronize computation of a plurality of paths (e.g. aggregate bandwidth consumption minimization). For example, the optimized sub-tree may be a minimum cost tree or a shortest path tree. Further, the sub-tree computation in one domain may be independent of the computation of another sub-tree in another domain.

Figure 11:
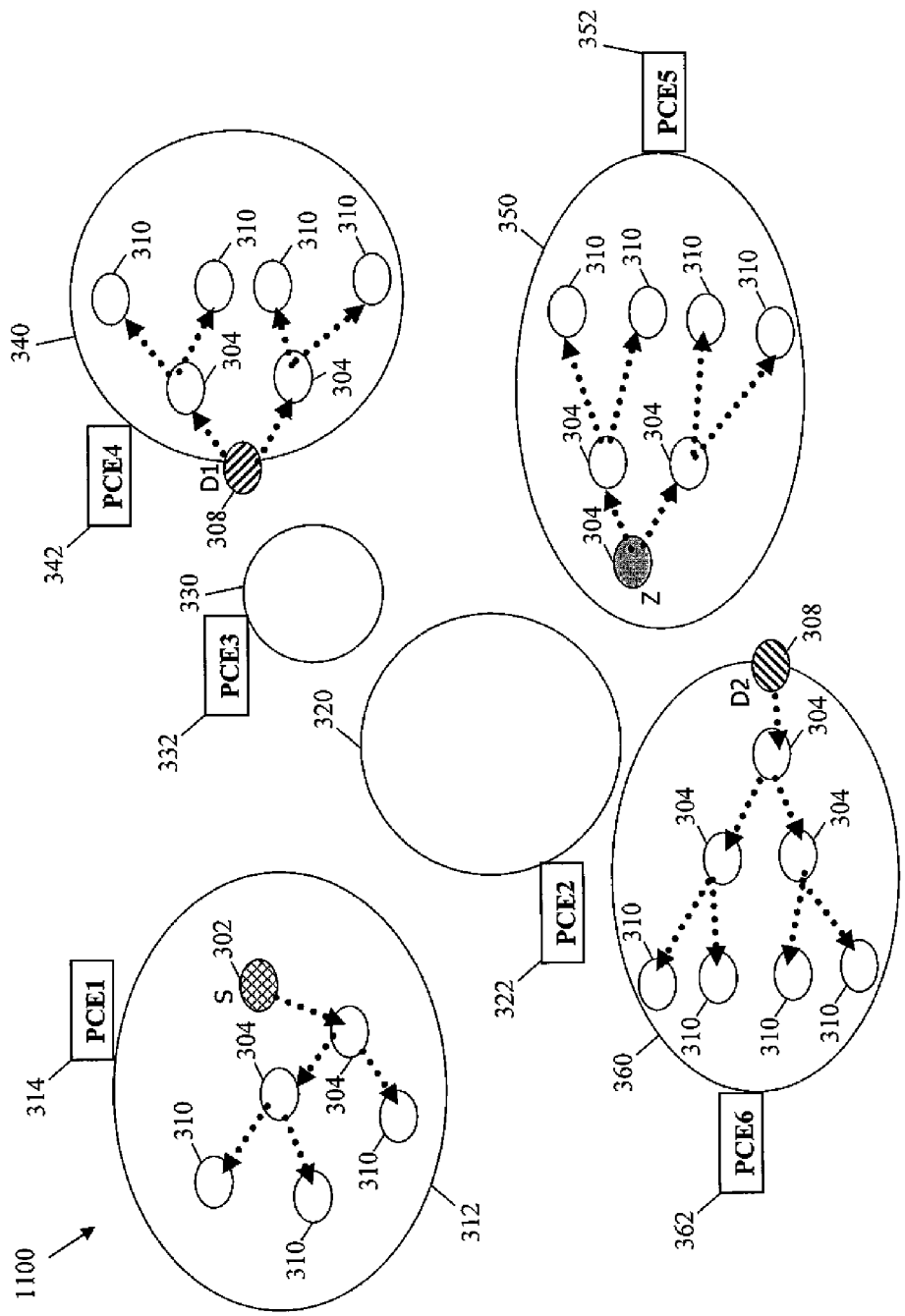
FIG. 11 is a schematic diagram of one embodiment of computed sub-trees.

FIG. 11 illustrates an embodiment of a plurality of computed sub-trees 1100, which may be combined with the core tree 1000 to obtain establish the inter-domain P2MP tree 300. The sub-trees 1100 may be computed in the domains that comprise the leaf nodes 310, e.g. the first domain 312, the fourth domain 340, the fifth domain 350, and the sixth domain 360. The sub-trees 1100 may each comprise a plurality of branch nodes 304 and some of the leaf nodes 310, which may be coupled to each other as shown in FIG. 11. Each sub-tree may also be coupled to a node of the core tree 1000. Specifically, a branch node 304 of the sub-tree in the first domain 312 may be coupled to the source node 302 S, two branch nodes 304 of the sub-tree in the fourth domain 340 may be coupled to the BN 308 D1, two branch nodes 304 of the sub-tree in the fifth domain 350 may be coupled to the branch node 304 Z, and a branch node 304 of the sub-tree in the sixth domain 360 may be coupled to the BN 308 D2. In an embodiment, the sub-trees 1100 may be computed in at least some of the domains using a CSPF procedure to obtain optimized shortest path trees.

Figure 12:
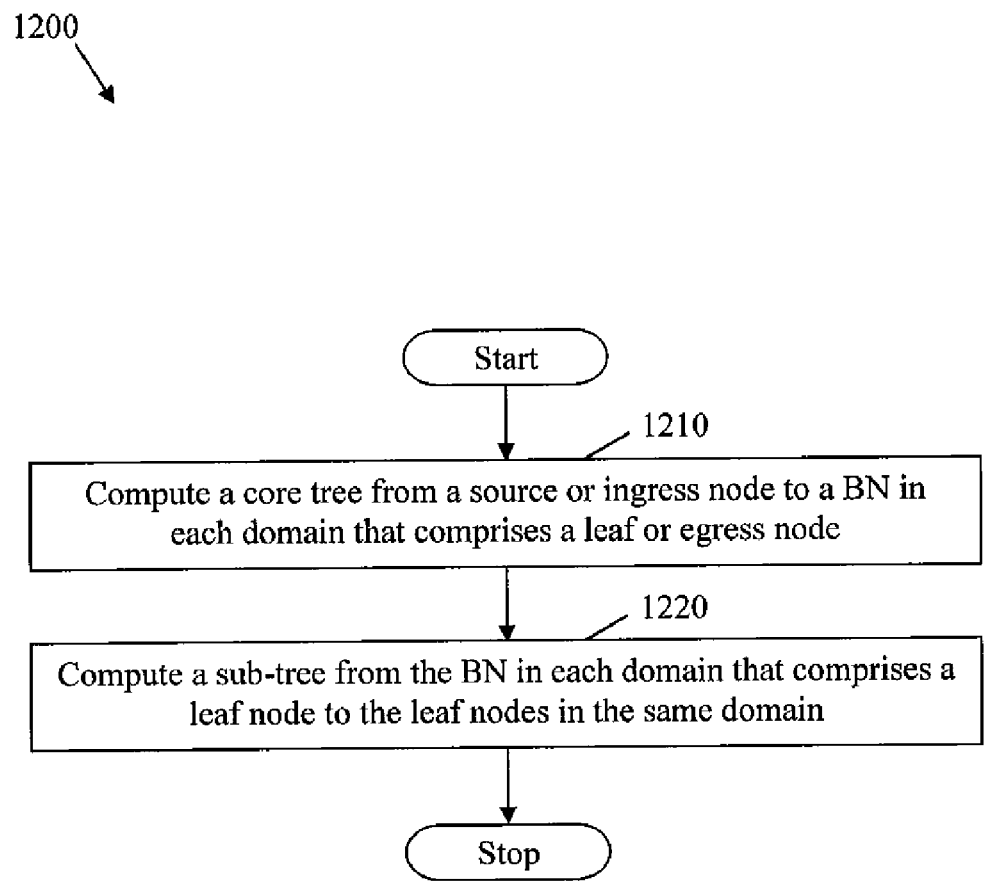
FIG. 12 is a flowchart of an embodiment of an inter-domain tree computation method.

FIG. 12 illustrates an embodiment of an inter-domain tree computation method 1200, which may be used to compute a P2MP tree across a plurality of domains, such as the inter-domain P2MP tree 300 or the inter-domain P2MP tree 200. The method 1200 may begin at block 1210, where a core tree may be computed from a source or ingress node to a BN in each domain that comprises some of the leaf or egress nodes. The core tree may be computed using the BRPC and VSPT procedures and may comprise a plurality of paths that extend from the ingress node to an entry node or BN in each domain that comprises a leaf node. At block 1220, a sub-tree may be computed from the BN in each domain that comprises a leaf node to the leaf nodes in the same domain. The sub-tree may be computed using the CSPF procedure and may comprise a plurality of paths that extend from the entry node or BN in each domain that comprises leaf nodes to the leaf nodes in the domain. The method 1200 may then end. In the method 1200, the core tree and the sub-trees may be computed independently and in any sequence. However, the information about the computed trees may be communicated between the PCEs that handle the computations, e.g. to guarantee a shared knowledge of the BNs in the domains that comprise the leaf nodes and hence improve path computation between the core tree and the sub-trees.

In an embodiment, the PCC (e.g. the source or ingress node) and PCEs may exchange a request message and reply message to compute new paths, to add branches to existing paths, or to store, delete, or re-optimize paths. The quantity of exchanged request and/or reply messages may be independent of the quantity of requested leaf nodes in the tree. The messages exchanged between the PCC and PCEs may indicate whether the computation request or reply is related to a P2MP path or P2P path. Additionally, the messages may comprise path computation information, which may be used to request or compute the path. For instance, the messages may comprise a request/reply (RP) object that indicates a standard P2MP path (e.g. in a single domain) or an inter-domain P2MP path related message, a PCE sequence object that specifies the distributed PCE topology associated with the domains, and/or an end-point object that specifies a source and at least one destination node for the path. The messages may also comprise an error object that indicates a computation failure, at least some nodes in the request message that may not be used, or both.

Figure 13:
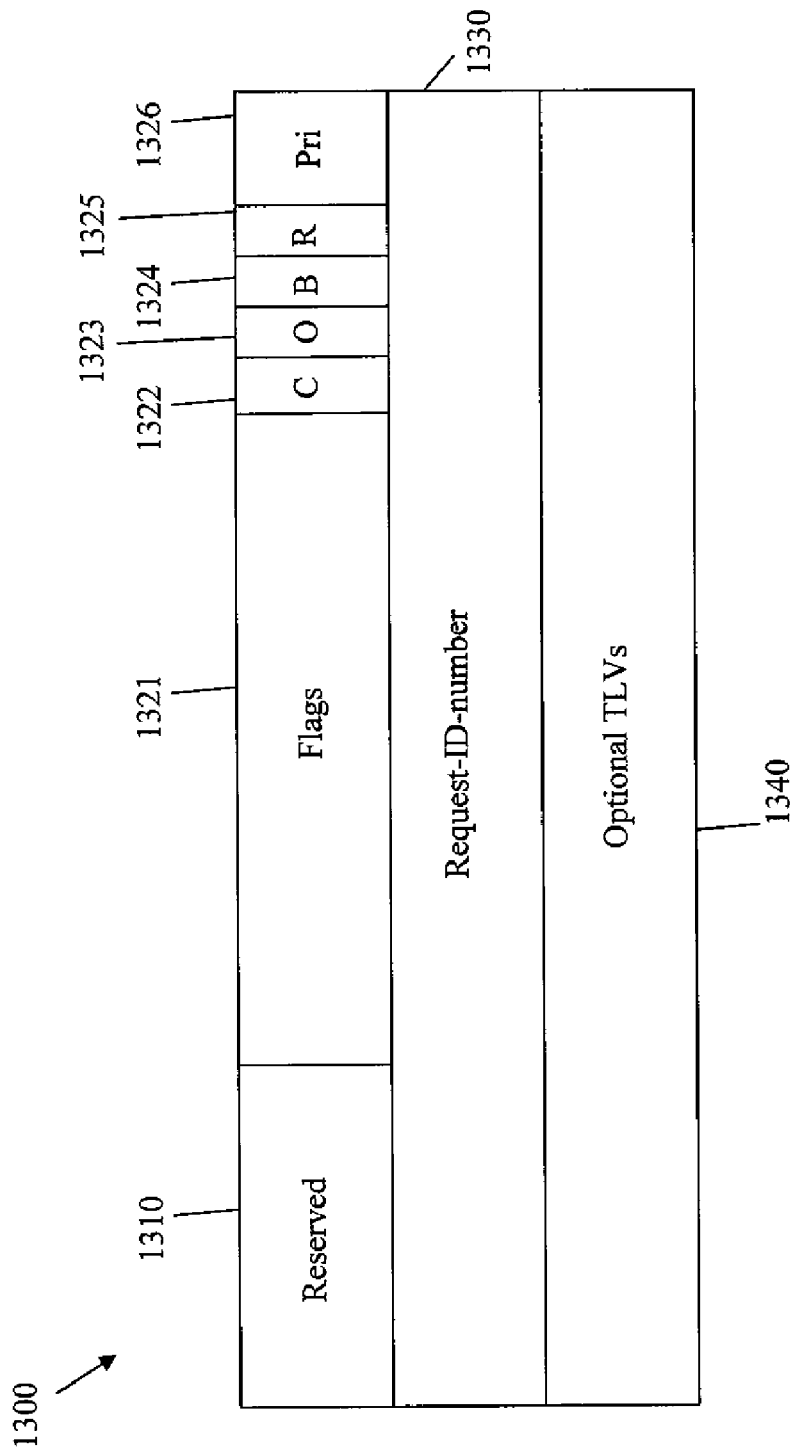
FIG. 13 is an illustration of one embodiment of a request/reply object.

FIG. 13 is an embodiment of a RP object 1300, which may be a part of a request message transmitted from the PCC or a reply message transmitted from a PCE. The RP object 1300 may also be exchanged between the PCEs associated with different domains. The RP object 1300 may comprise a Reserved field 1310, a plurality of Flags 1321, a RP Core Tree bit (C) flag 1322, a Strict/Loose bit (O) flag 1323, a Bi-directional bit (B) flag 1324, a re-optimization bit (R) flag 1325, a plurality of Priority (Pri) flags 1326, and a Request-ID-number 1330. Additionally, the RP object 1300 may optionally comprise at least one type-length-value (TLV) 1340, for instance to indicate path computation capabilities, path constraints, or other path information. The Flags 1321 may comprise a Fragmentation bit (F) flag, an explicit route object (ERO)-compression bit (E) flag, and/or a Multicast capability bit (M) flag. The Flags 1321 may also comprise additional bits, which may be unassigned or reserved. For instance, the remaining bits may be set to zero and ignored. In an embodiment, each of the C flag 1322, O flag 1323, B flag 1324, R flag 1325, and each flag in the Flags 1321 may have a length of about one bit, the Pri flags 1326 may have a combined length of about three bits, the Request-ID-number 1330 may have a length of about 32 bits, and the Reserved field 1310 may have a length of about eight bits.

In an embodiment, the C flag may be set to indicate that the request or reply message is related to an inter-domain P2MP path or tree computation. Further, at least some of the fields of the RP object 1300 may be configured based on the PCEP. For instance, the Reserved field 1321 may be reserved for other purposes and/or may not be used. The O flag 1323 may be set in a request message to indicate that a loose path is acceptable or may be cleared to indicate that a path comprising exclusively strict hops is required. On the other hand, the O flag 1323 may be set in a reply message to indicate that the computed path is loose or may be cleared to indicate that the computed path comprises strict hops. The B flag 1324 may be set to indicate that a path computation request relates to at least one bidirectional TE LSP, which may have the same TE requirements in each direction, such as fate sharing, protection and restoration, LSRs, TE Links, resource requirements (e.g., latency and jitter), etc. Otherwise, the B flag 1324 may be cleared to indicate that the LSP is unidirectional. The R flag 1325 may be set to indicate that a computation request relates to re-optimizing an existing path or branch. The Pri flags 1326 may be used to specify a recommended request priority. For instance, the Pri flags 1326 may have a value from about one to about seven, which may be set locally at the PCC. Alternatively, the P flags 1326 may be set to zero when the request priority is not specified. The Request-ID-number 1330 may be combined with the source IP address of the PCC or the PCE network address to identify the path computation request context. The Request-ID-number may be changed or incremented each time a new request is sent to the PCE. In some embodiments, the E flag may be set to indicate that the path information is represented in a compressed format or may be cleared otherwise. The M flag may be set to indicate whether the request message or reply message is related to a P2MP path or P2P path computation.

Figure 14:
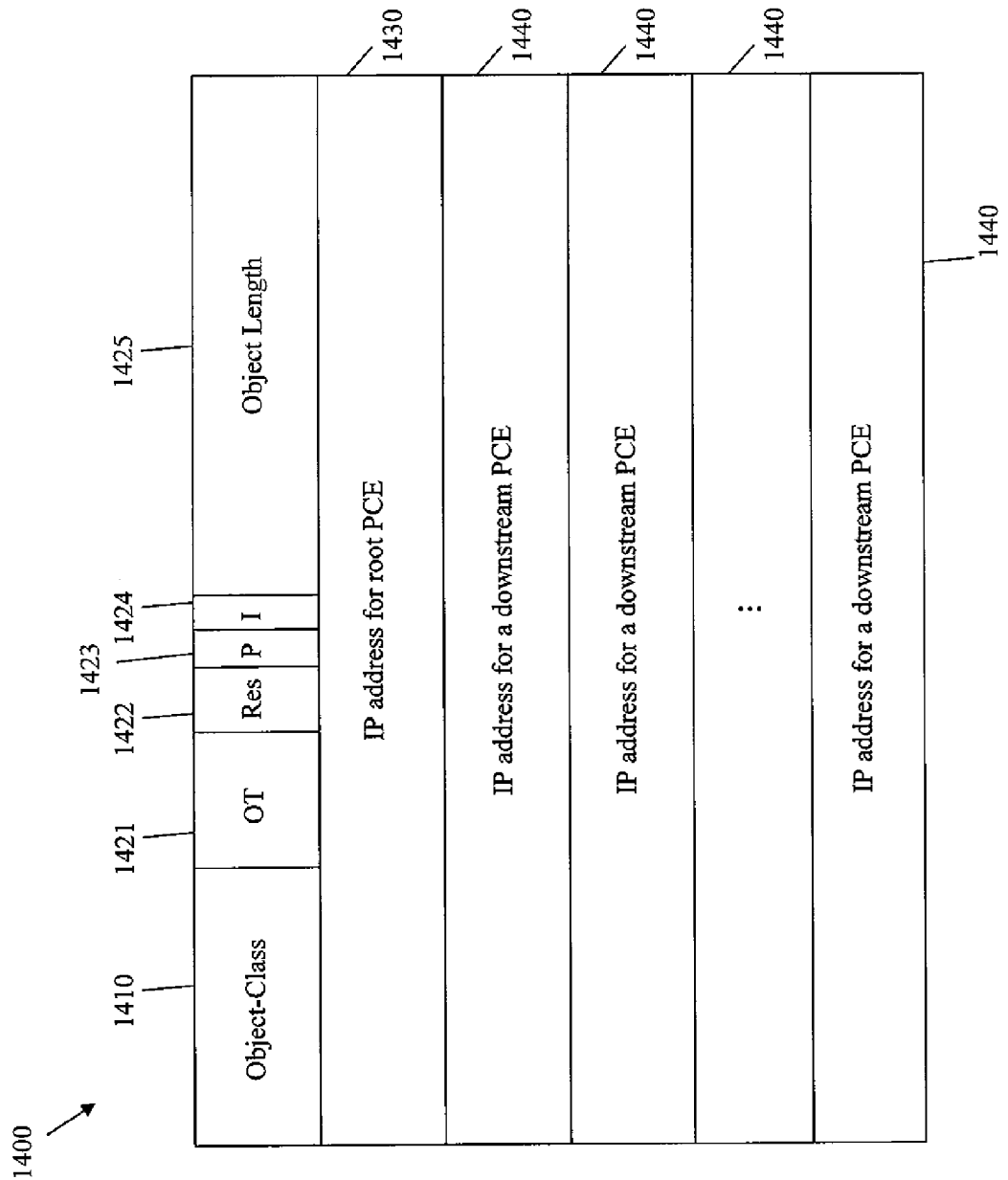
FIG. 14 is an illustration of one embodiment of a PCE sequence object.

FIG. 14 is an embodiment of a PCE sequence or chain object 1400, which may be exchanged between the PCEs associated with different domains to specify the distributed PCE topology associated with a P2MP path computation and a plurality of domains. The PCE sequence object 1400 may comprise an Object-Class field 1410, an object type (OT) field 1421, a reserved (Res) field 1422, a P flag 1423, an I flag 1424, an object length field 1425, a first PCE address field 1430, and at least one second PCE address field 1440. The first PCE address field 1430 may specify a network address of the root PCE in the distributed PCE topology. The second PCE address fields 1440 may specify the network addresses of a plurality of subsequent (e.g. downstream) PCEs in the PCE topology sequence or chain, which may comprise at least a leaf PCE, and optionally a transit PCE and/or a branch PCE. The PCE addresses may be Internet Protocol (IP) version 4 (IPv4) or IP version 6 (IPv6) addresses and may each have a length equal to about 32 bits or 128 bits. Additionally, the Object-Class field 1410 and the OT field 1421 may be configured to indicate that PCE sequence object 1400 comprises a plurality of addresses (e.g. IPv4 addresses) associated with a plurality of PCEs in a distributed PCE topology across multiple domains. The remaining fields of the PCE sequence object 1400 may be configured according to current PCEP standards and requirements.

Figure 15:
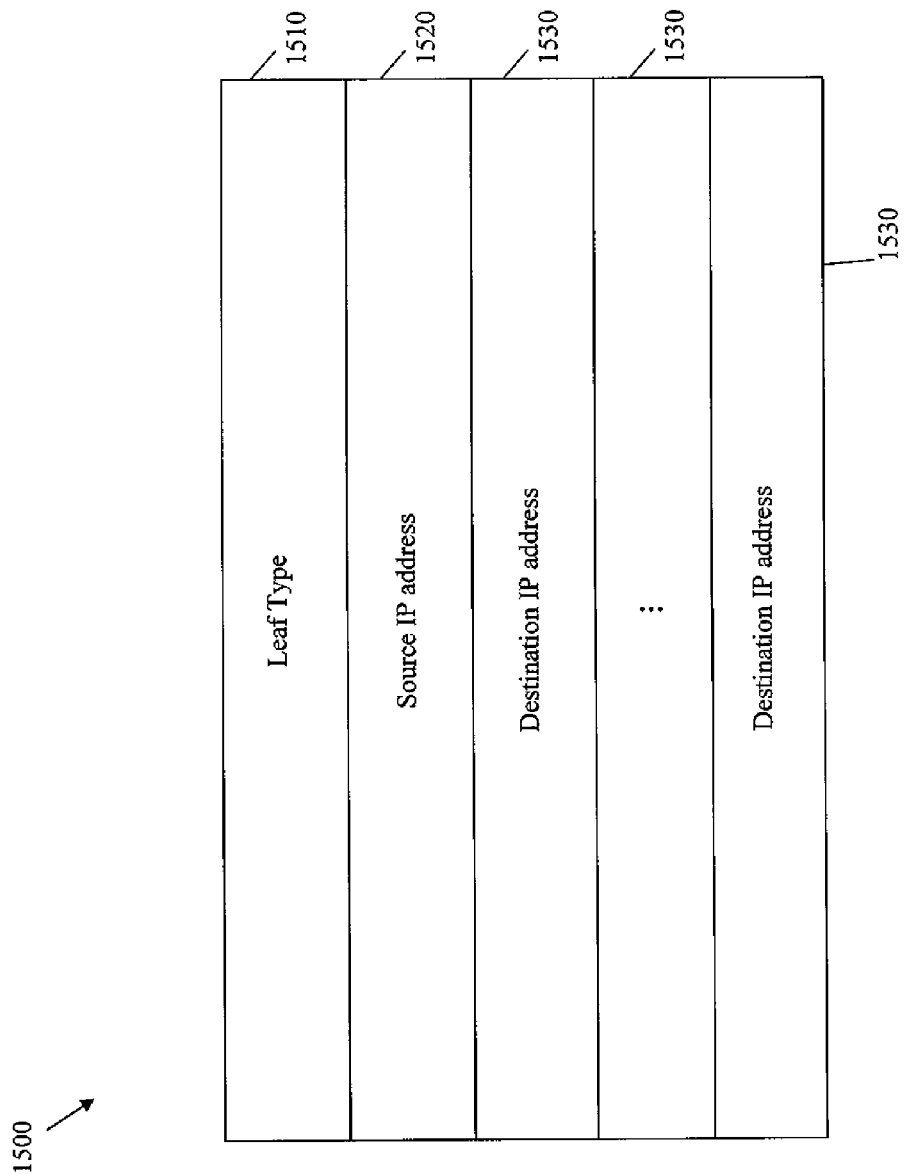
FIG. 15 is an illustration of one embodiment of an endpoint object.

FIG. 15 is an embodiment of end-point object 1500 which may be a part of a request message transmitted from the PCC or a PCE. The end-point object 1500 may be used to specify a source node and a plurality of destination or leaf nodes for a P2MP path computation. The end-point object 1500 may comprise a Leaf Type field 1510, a source address field 1520, and a plurality of destination address fields 1530. The Leaf Type field 1510 may indicate whether the object is associated with a request to add a new leaf to the tree, to remove a leaf from the tree, to modify or re-compute a path for a leaf, or to maintain and keep the path to the leaf unchanged. The source address field 1520 may indicate the address of the root or source node of the tree and the destination address fields 1530 may indicate the addresses of the destination or leaf nodes of the tree. In an embodiment, the source address and the destination addresses may be IPv4 addresses. Alternatively, the root address and the destination addresses may be IPv6 addresses.

In an embodiment, the inter-domain P2MP path computation messages may be configured to satisfy at least some of the following requirements:
1—Indication of P2MP Path computation request.
2—Indication of P2MP objective functions.
3—Non-support of P2MP path computation.
4—Non-support by back-level PCE implementations.
5—Specification of destinations.
6—Indication of P2MP paths.
7—Multi-message requests and responses.
8—Non-specification of per-destination constraints and parameters.
9—Path modification and path diversity.
10—Re-optimization of P2MP TE LSPs.
11—Addition and removal of destinations from existing paths.
12—Specification of applicable branch nodes.
13—Capabilities exchange.
14—Multi-message request and response.

In an embodiment, the PCC and PCEs may exchange a reply message, which may have the following format:

```
<PCReq Message>::= <Common Header>
    [<svec-list>]
    <request-list>
where:
    <svec-list>::=<SVEC>[<svec-list>]
    <request-list>::=<request>[<request-list>]
    <request>::= <RP with P2MP Ext.>
        <end-point-rro-iro-list>
        [<BANDWIDTH>]
        [<LSPA>]
        [<metric-list>]
Where:
    <end-point-rro-iro-list>::=<END-POINTS>[<RRO-IRO-list>]
    [<end-point-rro-iro-list>]
    <RRO-IRO-list>::=[<RRO>][ IRO] [<PRO-IRO-list>]
    <metric-list>::=<METRIC>[<metric-list>]
```

In an embodiment, the PCC and PCEs may exchange a request message, which may have the following format:

```
<PCRep Message>::= <Common Header>
    [<svec-list>]
    <response-list>
where: <svec-list>::=<SVEC>[<svec-list>]
    <response-list>::=<response>[<response-list>]
    <response>::=<RP with P2MP flag>
        [<end-point-path-pair-list>]
        [<NO-PATH>]
        [<attribute-list>]
where:<end-point-path-pair-list>::=
    [<END-POINTS>]<path-list>[<end-point-path-pair-list>]
```

-continued

```
<path-list> ::= <ERO>|<SERO>[<path-list>]
<attribute-list>::=[<OF>]
        [<LSPA>]
        [<BANDWIDTH>]
        [<metric-list>]
        [<IRO>]
```

In an embodiment, a plurality of manageability requirements described in the Internet Engineering Task Force (IETF) document draft-yasukawa-pce-p2mp-req-05 and the IETF Request for Comments (RFC) 5440, which are incorporated herein by reference as if reproduced in their entirety, may be used to support inter-domain P2MP path or tree computation. For instance, the PCE may require information about the P2MP signaling and branching capabilities of the nodes (e.g. LSRs) in the network. The PCEP protocol may also be extended to satisfy additional manageability requirements. For instance, a plurality of control parameters may be used and/or exchanged, e.g. for function and/or policy control. The control parameters may comprise a parameter to enable or disable P2MP path computation, enable or disable P2MP path computation capability advertisement (e.g. using discovery protocol or capability exchange), or both. Additionally, a plurality of management information base (MIB) objects, e.g. for information and data models, may be used to support inter-domain P2MP tree computation, as described in the IETF document draft-yasukawa-pce-p2mp-req-05.

Figure 16:
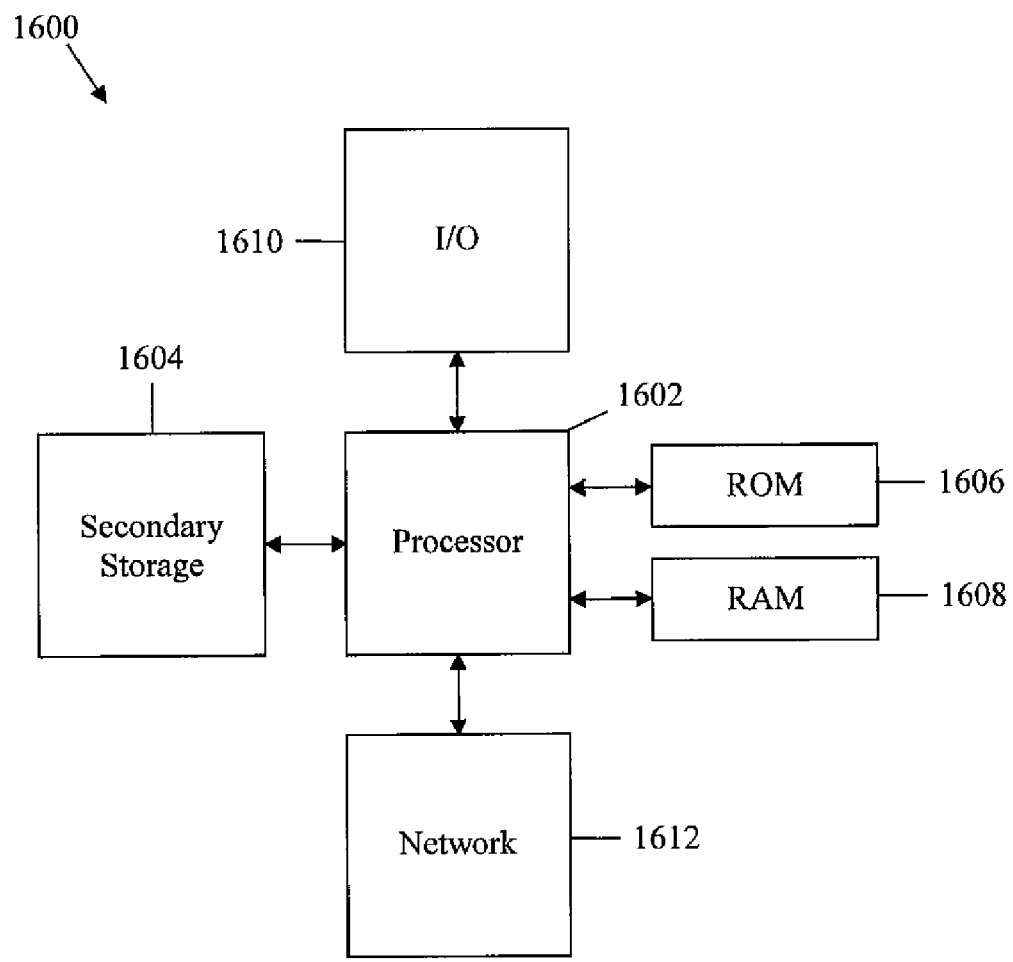
FIG. 16 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 16 illustrates a typical, general-purpose network component 1600 suitable for implementing one or more embodiments of the components disclosed herein. The network component 1600 includes a processor 1602 (which may be referred to as a central processor unit or CPU) that is in communication with memory devices including secondary storage 1604, read only memory (ROM) 1606, random access memory (RAM) 1608, input/output (I/O) devices 1610, and network connectivity devices 1612. The processor 1602 may be implemented as one or more CPU chips, or may be part of one or more application specific integrated circuits (ASICs).

The secondary storage 1604 is typically comprised of one or more disk drives or erasable programmable ROM (EPROM) and is used for non-volatile storage of data. Secondary storage 1604 may be used to store programs that are loaded into RAM 1608 when such programs are selected for execution. The ROM 1606 is used to store instructions and perhaps data that are read during program execution. ROM 1606 is a non-volatile memory device that typically has a small memory capacity relative to the larger memory capacity of secondary storage 1604. The RAM 1608 is used to store volatile data and perhaps to store instructions. Access to both ROM 1606 and RAM 1608 is typically faster than to secondary storage 1604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system comprising:
a plurality of path computation elements (PCEs) configured to communicate with an ingress node, jointly compute a core tree for an inter-domain point-to-multipoint (P2MP) tree across a plurality of network domains, and independently compute a plurality of sub-trees in at least some of the network domains that contain at least one destination node,
wherein the core tree connects the ingress node to at least one boundary node (BN) in each one of the network domains that have has a destination node,
wherein each sub-tree connects at least one of the BNs to at least one destination node in one of the network domains that has a destination node, and
wherein the inter-domain P2MP tree is a combination of the core tree and at least one sub-tree.

2. The system of claim 1, wherein the core tree comprises the ingress node, the BNs in each of the domains that has a destination node, at least one BN of a domain that does not have any destination node, and a branch node, a transit node, or both, and wherein the sub-tree comprises a branch node, a transit node, or both, and the destination nodes.

3. The system of claim 1, wherein the PCEs are arranged in a distributed PCE topology that comprise a root PCE associated with one of the network domains that comprises the ingress node, a transit PCE associated with one of the domains that transfers traffic from the ingress node to another one of the domains, a branch PCE associated with one of the domains that forwards traffic from the ingress node to at least two of the domains, and a leaf PCE associated with one of the domains that comprises the destination nodes.

4. The system of claim 3, wherein at least some of the PCEs and the ingress node exchange a PCE sequence object that specifies the distributed PCE topology, wherein the PCE sequence object comprises an object class, an object type (OT), an object length, a root PCE address, and a leaf PCE address.

5. The system of claim 1, wherein at least some of the PCEs and the ingress node exchange a request/reply (RP) object that indicates a path computation request/reply for the inter-domain P2MP tree.

6. The system of claim 5, wherein the RP object comprises a RP core tree bit (C) flag, a strict/loose bit (O) flag, a bi-directional bit (B) flag, a re-optimization bit (R) flag, a plurality of priority flags, a plurality of other flags, and a request identifier (ID) number.

7. The system of claim 6, wherein the C flag is set to indicate that the request or reply message is for a core tree related to an inter-domain P2MP tree computation.

8. The system of claim 1, wherein at least some of the PCEs and the ingress node exchange an end-point object that comprises an address for the ingress node, a plurality of addresses for the destination nodes, and a leaf type.

9. The system of claim 8, wherein the leaf type is set to indicate whether the object is associated with a request to add a new leaf to the P2MP tree, to remove a leaf from the P2MP tree, to modify or re-compute a path for an existing leaf, or to maintain and keep the path to the leaf unchanged.

10. A network component comprising:
at least one processor configured to obtain a computation request for an inter-domain point-to-multipoint (P2MP) tree from a source node to a plurality of leaf nodes across a plurality of network domains;
compute a core tree that comprises a plurality of paths from the source node to a boundary node (BN) in each of the network domains that comprises at least some of the leaf nodes;
calculate a sub-tree for each of the network domains that comprises at least some of the leaf nodes from at least one of the BNs in the core tree to the leaf nodes; and
send a result of the inter-domain P2MP tree computation to the source node,
wherein the inter-domain P2MP tree is a combination of the core tree and at least one sub-tree.

11. The network component of claim 10, wherein the core tree is computed using a Backward Recursive Path Calculation (BRPC) procedure and a Virtual Shortest Path Tree (VSPT) procedure.

12. The network component of claim 11, wherein the at least one processor is further configured to:
compute a plurality of sub-paths from the source node to the BN in each of the network domains that comprises at least some of the leaf nodes;
calculate a cost for each combination of the sub-paths that connect the source node to the BN in each of the network domains that comprises at least some of the leaf nodes; and
select a combination of the sub-paths that best satisfies a metric.

13. The network component of claim 12, wherein each of the sub-paths is computed by adding a plurality of nodes to a path in a sequence from the BN in each of the network domains to the source node.

14. The network component of claim 10, wherein a sub-tree is computed independently from the core tree to connect the BN to the leaf nodes in each of the network domains that comprises at least some of the leaf nodes.

15. The network component of claim 14, wherein the sub-tree is computed using a Constrained Shortest Path First (CSPF) procedure.

16. The network component of claim 14, wherein the sub-tree is computed based on an objective function (OF) that is used to compute a path, to synchronize computation of a plurality of paths, or both.

17. The network component of claim 10, wherein the result of the inter-domain P2MP tree computation comprises an inter-domain P2MP tree from the source node to the destination nodes if the inter-domain P2MP tree is computed successfully.

18. The network component of claim 10, wherein the result of the inter-domain P2MP tree computation comprises an error code and detail information for a reason why an inter-domain P2MP tree can not be found if no inter-domain P2MP tree is computed.

19. A method comprising:
computing, at least one path computation element (PCE), a core tree from a source node to a boundary node (BN) in each of a plurality of domains that comprise a leaf node;
computing a sub-tree from the BN in each of the domains to the leaf node in the same domains; and
combining the core tree and the sub-tree in each of the domains to establish an inter-domain point-to-multipoint (P2MP) tree.

20. The method of claim 19, wherein the sub-tree is computed in each of the domains independently without sharing confidential information between the domains, and the sub-tree is a minimum cost tree or a shortest path tree.

21. The method of claim 20, wherein computing the core tree comprises selecting the core tree from among at least two candidate trees according to a total cost of the core tree.

22. A method comprising:
performing, by at least one path computation element (PCE), a core tree computation procedure to compute a core tree, wherein the core tree comprises a root node and at least one boundary node in each of a plurality of network domains that have a destination node;
performing a sub-tree computation procedure to compute a plurality of sub-trees, one sub-tree for each network domain that has a destination node; and
combining the sub-trees and the core tree to form an inter-domain point-to-multipoint (P2MP) tree.

23. The method of claim 22, wherein performing a core tree computation procedure comprises:
using a backwards recursive path computation (BRPC) procedure to compute a plurality of paths from the root node to each boundary node in each of the plurality of network domains that have a destination node, wherein the plurality of paths from the root node to the ith boundary node is referred to as the ith Virtual Shortest Path Tree VSPT(i);
pick a first set of paths comprising a path from the root to the ith boundary node in each VSPT(i) for all i and merge the first set of paths into a core tree candidate;
pick a second set of paths from the root to the ith boundary node in each VSPT(i) for all i and merge the second set of paths into a second core tree candidate, wherein the second set of paths is different from the first set of paths by at least one path; and
select the core tree as a core tree candidate from among a plurality of core tree candidates with a minimum cost by applying an objective function (OF) to each core tree candidate, wherein the plurality of core tree candidates includes the first and second core tree candidates.

24. The method of claim 23, wherein the BRPC procedure does not prune any paths at transit nodes.

* * * * *

UNITED STATES PATENT AND TRADEMARK OFFICE
CERTIFICATE OF CORRECTION

PATENT NO. : 8,351,418 B2
APPLICATION NO. : 12/708048
DATED : January 8, 2013
INVENTOR(S) : Qianglin Quintin Zhao and Huaimo Chen It is certified that error appears in the above-identified patent and that said Letters Patent is hereby corrected as shown below:

In the Claims:

Column 19, line 60 - Claim 1 should read as follows:

1. A system comprising:
    a plurality of path computation elements (PCEs) configured to communicate with an ingress node, jointly compute a core tree for an inter-domain point-to-multipoint (P2MP) tree across a plurality of network domains, and independently compute a plurality of sub-trees in at least some of the network domains that contain at least one destination node,
    wherein the core tree connects the ingress node to at least one boundary node (BN) in each one of the network domains that has a destination node,
    wherein each sub-tree connects at least one of the BNs to at least one destination node in one of the network domains that has a destination node, and
    wherein the inter-domain P2MP tree is a combination of the core tree and at least one sub-tree.

Column 21, line 41 - Claim 19 should read as follows:

19. A method comprising:
    computing, by at least one path computation element (PCE), a core tree from a source node to a boundary node (BN) in each of a plurality of domains that comprise a leaf node;
    computing a sub-tree from the BN in each of the domains to the leaf node in the same domains; and
    combining the core tree and the sub-tree in each of the domains to establish an inter-domain point-to-multipoint (P2MP) tree.

Signed and Sealed this
Twenty-second Day of October, 2013

Teresa Stanek Rea
*Deputy Director of the United States Patent and Trademark Office*